United States Patent
Shimizu

(10) Patent No.: US 9,473,054 B2
(45) Date of Patent: Oct. 18, 2016

(54) ANGLE DETECTION APPARATUS, MOTOR DRIVING CONTROL APPARATUS AND ANGLE DETECTION METHOD

(71) Applicant: Fumihiro Shimizu, Kanagawa (JP)

(72) Inventor: Fumihiro Shimizu, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 125 days.

(21) Appl. No.: 14/574,485

(22) Filed: Dec. 18, 2014

(65) Prior Publication Data

US 2015/0176965 A1 Jun. 25, 2015

(30) Foreign Application Priority Data

Dec. 25, 2013 (JP) ................... 2013-266929

(51) Int. Cl.
*H02P 6/16* (2016.01)
*G01D 5/244* (2006.01)

(52) U.S. Cl.
CPC ............ *H02P 6/16* (2013.01); *G01D 5/24476* (2013.01)

(58) Field of Classification Search
CPC ........................................................ H02P 6/16
USPC .................. 318/400.38, 400.37, 400.01, 700
See application file for complete search history.

(56) References Cited

U.S. PATENT DOCUMENTS 6,339,308 B2* 1/2002 Shinnaka ................ 318/701
8,860,346 B2 10/2014 Shimizu et al.

FOREIGN PATENT DOCUMENTS

JP 4111813 7/2008
JP 2013-108971 6/2013

OTHER PUBLICATIONS

U.S. Appl. No. 14/315,614, filed Jun. 26, 2014.

* cited by examiner

*Primary Examiner* — David S Luo
(74) *Attorney, Agent, or Firm* — Harness, Dickey & Pierce, P.L.C.

(57) ABSTRACT

Determining an amount of rotating a vector according to a result of comparing the rotated vector with a predetermined phase and rotating the vector according to the determined amount of rotating the vector are repeated to acquire the determined amount of rotating the vector as a rotation angle of a rotation shaft. Based on the thus acquired amount of rotating the vector, a rotation angle change signal is generated for acquiring a state of a change of the rotation angle of the rotation shaft. A signal indicating to increase or decrease a fixed amount is generated for increasing or decreasing the amount of rotating the vector according to the result of the comparison.

11 Claims, 25 Drawing Sheets

ROTATION ANGLE: $-\theta 1=-180°$

| | bit5 | ··· | | | | bit0 |
|---|---|---|---|---|---|---|
| SAR[5:0] | 1 | 0 | 0 | 0 | 0 | 0 |

FIX VALUE OF bit5
FROM ROTATION RESULT Y'(1)>0

| | bit5 | ··· | | | | bit0 |
|---|---|---|---|---|---|---|
| SAR[5:0] | 1 | 0 | 0 | 0 | 0 | 0 |

ROTATION ANGLE: $-\theta_1 - \theta_2 = -180° -90°$

| | bit5 | | | | | bit0 |
|---|---|---|---|---|---|---|
| SAR[5:0] | 1 | 1 | 0 | 0 | 0 | 0 |

FIX VALUE OF bit4
FROM ROTATION RESULT Y'(2)<0

| | bit5 | | | | | bit0 |
|---|---|---|---|---|---|---|
| SAR[5:0] | 1 | 0 | 0 | 0 | 0 | 0 |

| θd[1:0] | | Ea | Eb |
|---|---|---|---|
| bit1 | bit0 | | |
| 0 | 0 | H | L |
| 0 | 1 | H | H |
| 1 | 0 | L | H |
| 1 | 0 | L | L |

(H:High, L:Low)

| θ d[1:0] | | Ea | Eb |
|---|---|---|---|
| bit1 | bit0 | | |
| 0 | 0 | H | L |
| 0 | 1 | H | H |
| 1 | 0 | L | H |
| 1 | 1 | L | L |

(H:High, L:Low)

FIG.33
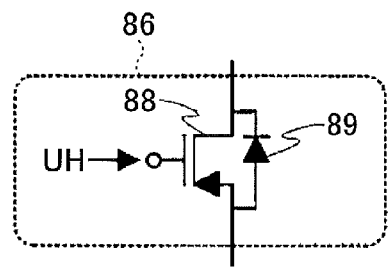
FIG.34
| | | OUTPUT VALUE AND CONDITION | |
|---|---|---|---|
| | | High | Low |
| HG | HU | HU+ ≧ HU− | HU+ < HU− |
| | HV | HV+ ≧ HV− | HV+ < HV− |
| | HW | HW+ ≧ HW− | HW+ < HW− |
FIG.35
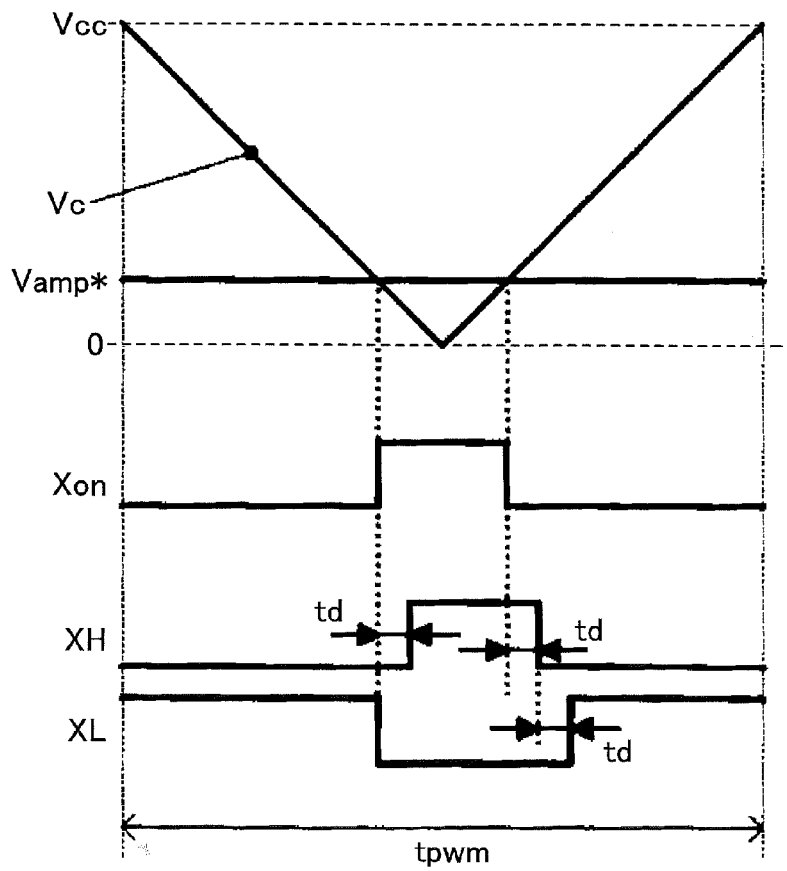

|  | UPPER GATE SIGNAL YH | LOWER GATE SIGNAL YL |
|---|---|---|
| PWM-PHASE | XH | XL |
| LOW-PHASE | CONSTANTLY Lo | CONSTANTLY Hi |
| HiZ-PHASE | CONSTANTLY Lo | CONSTANTLY Lo |

(Y: U, V, W)

ANGLE DETECTION APPARATUS, MOTOR DRIVING CONTROL APPARATUS AND ANGLE DETECTION METHOD

BACKGROUND OF THE INVENTION

1. Field of the Invention

The present invention relates to an angle detection apparatus, a motor driving control apparatus including the angle detection apparatus and an angle detection method.

2. Description of the Related Art

When controlling the rotation angle of a motor (i.e., position control), it is necessary to detect the rotation angle of the motor. As a common way, there is a method of detecting the rotation angle of the rotor by connecting a rotary encoder to the rotation shaft of the rotor of the motor. In this method, two-phase pulse signals having the phase difference of a quarter cycle and changing according to the rotation angle are output, and a relative rotation angle is detected by detecting the edges of the signals and the High (Hi)/Low (Lo) states of the two phases.

For example, an optical encoder uses a disk having slits placed circularly at equal intervals near a peripheral edge part and two photo interrupters placed having a distance that is ¼ the pitch of the slits of the disk. By binarizing the output signals of the two photo interrupters, it is possible to obtain the above-mentioned two-phase pulse signals.

As a method of detecting the rotation angle of a rotating member, the following method is also known. In this method, a rotating member having a permanent magnet mounted thereon and a magnetic sensor installed near the rotating member are rotated relatively. The rotation angle is detected from the output waveform of the magnetic sensor changing according to the rotation, and the above-mentioned two-phase pulse signals are output according to the thus detected rotation angle.

SUMMARY OF THE INVENTION

According to one aspect of the present invention, an angle detection apparatus includes a plurality of sensors placed at predetermined positions with respect to a rotation shaft and configured to output a plurality of signals having amplitudes periodically changing according to a rotation of the rotation shaft and having phases different from each other according to the predetermined positions; a vector generation part configured to derive a vector having a phase that changes according to the rotation of the rotation shaft based on the plurality of signals that are output by the plurality of sensors; an angle search part including a vector rotation part configured to rotate the vector differently from the rotation of the rotation shaft, a comparison part configured to compare the vector rotated by the vector rotation part with a predetermined phase and output a rotation amount determination signal according to a result of the comparison and a rotation amount determination part configured to determine, according to the rotation amount determination signal, a rotation amount by which the vector rotation part rotates the vector, the angle search part being configured to acquire the rotation amount determined by the rotation amount determination part as a rotation angle of the rotation shaft by repeating a process of the rotation amount determination part determining, according to the rotation amount determination signal, the rotation amount by which the vector rotation part rotates the vector and a process of the vector rotation part rotating the vector according to the rotation amount determined by the rotation amount determination part; and a rotation angle change signal generation part configured to generate, based on the rotation amount determined by the rotation amount determination part, a rotation angle change signal for acquiring a state of a change of the rotation angle of the rotation shaft. The rotation amount determination signal that is output by the comparison part is a signal indicating to increase or decrease a fixed amount for increasing or decreasing, according to the result of the comparison, the rotation amount by which the vector rotation part rotates the vector.

Other objects, features and advantages of the present invention will become more apparent from the following detailed description when read in conjunction with the accompanying drawings.

BRIEF DESCRIPTION OF THE DRAWINGS

FIG. 33 illustrates one example of an upper arm of a driving commutation circuit;

FIG. 34 illustrates one example of conditions of generating Hall signals;

FIG. 35 illustrates one example of an operation of a PWM part;

DETAILED DESCRIPTION OF THE EMBODIMENTS

First, for convenience of explanation, an apparatus configuration disclosed by Japanese Laid-Open Patent Application No. 2013-108971 (Patent Reference No. 1) will be described as a comparison example using FIG. 1.

Figure 2:
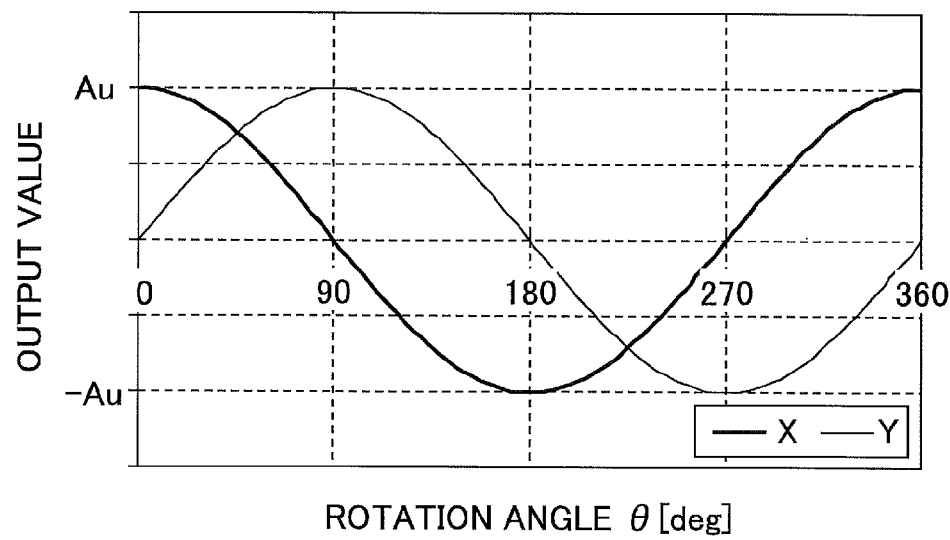
FIG. 2 illustrates an X-axis signal and a Y-axis signal in the configuration illustrated in FIG., 1.

In the configuration of Patent Reference No. 1, a plurality of magnetic sensors are installed at predetermined phase angles near a rotating member having a permanent magnet. Then, a plurality of sine wave signals changing in a sine wave manner according to the rotation angle of the rotating member and having mutually different phases, that are output by the magnetic sensors, are added/subtracted therebetween. Thus, an X-axis signal X and a Y-axis signal Y, shown in FIG. 2 and the following formula (1), that are orthogonal to each other, are generated.

$$\begin{cases} X = Au*\cos(\theta) \\ Y = Au*\sin(\theta) \end{cases} \text{(when the amplitude is the same)} \quad (1)$$

Figure 1:
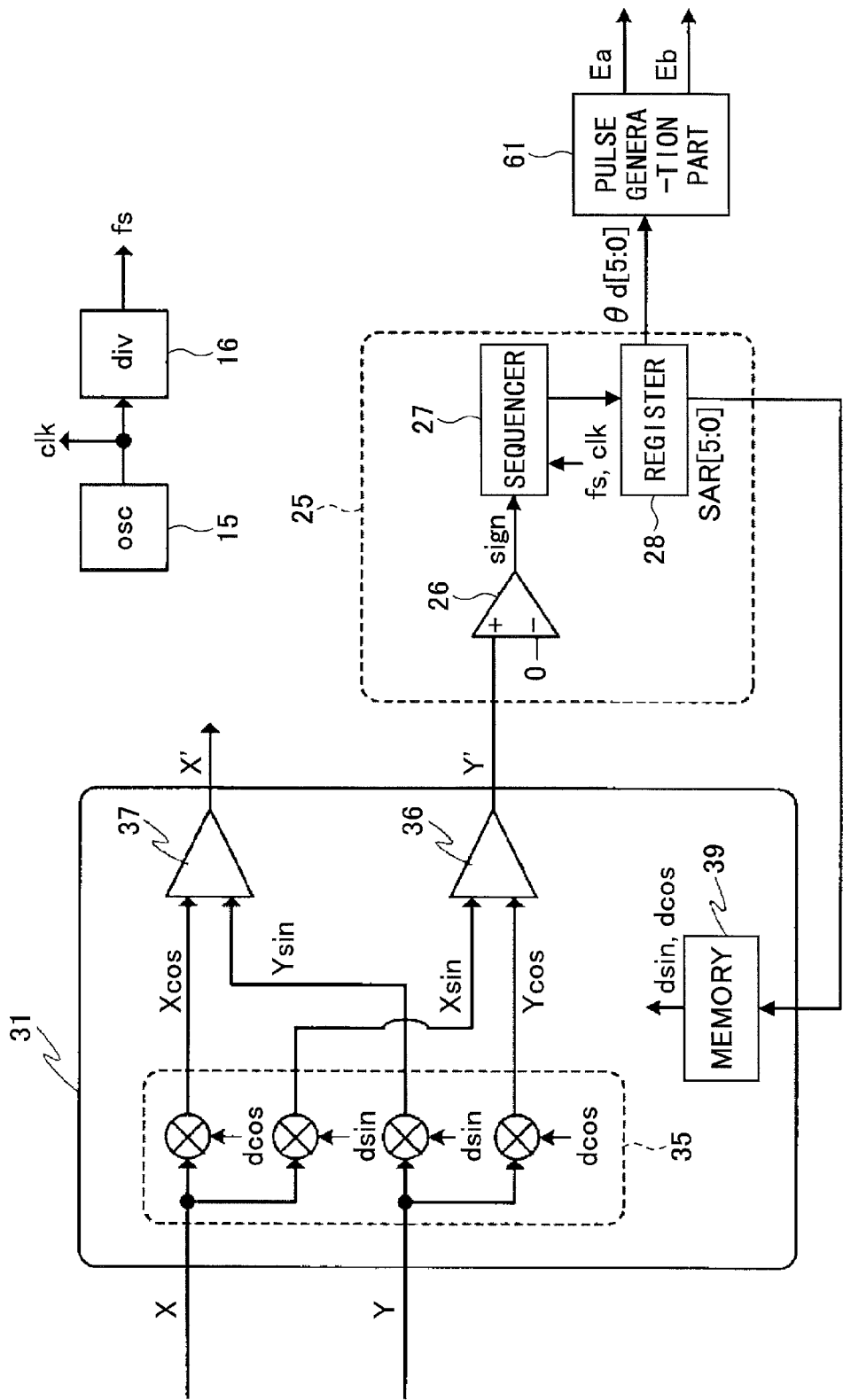
FIG. 1 illustrates an apparatus configuration of a comparison example.

A rotation operating part 31 shown in FIG. 1 includes a multiplication part 35, a Y-axis subtraction part 36, an X-axis addition part 37 and a memory 39. A vector expressed by the X-axis signal X and the Y-axis signal Y is transformed through a rotation transform according to a register value SAR described later. The rotated vector expressed by the thus acquired transform results, i.e., the rotated X-axis signal X' and the rotated Y-axis signal Y', is output.

The multiplication part 35 multiplies, with these X-axis signal X and Y-axis signal Y, sine data d sin and cosine data d cos described later, respectively, and outputs the thus-acquired multiplication results as X sin, X cos, Y sin and Y cos, as shown in the following formula (2):

$$\begin{cases} X\sin = X*d\sin \\ Y\cos = Y*d\cos \\ X\cos = X*d\cos \\ Y\sin = Y*d\sin \end{cases} \quad (2)$$

The Y-axis subtraction part 36 carries out a subtraction operation shown in the lower part of the formula (3), and outputs the operation result as the rotated Y-axis signal Y'.

$$\begin{cases} X' = X\cos + Y\sin \\ Y' = -X\sin + Y\cos \end{cases} \quad (3)$$

The X-axis addition part 37 carries out an addition operation shown in the upper part of the formula (3), and outputs the operation result as the rotated X-axis signal X'. For convenience of explanation, explanation as to how to use the rotated X-axis signal X' is omitted here.

Figure 3:
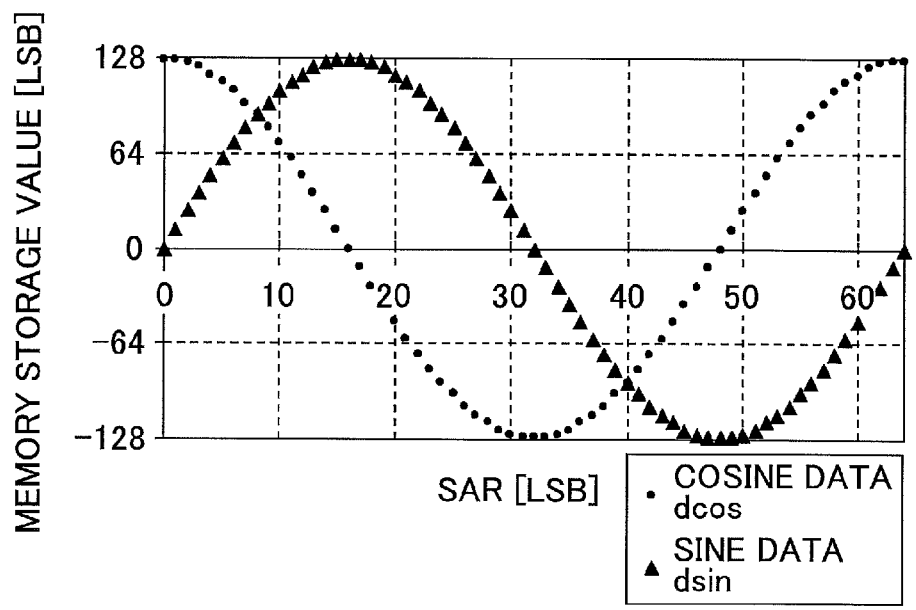
FIG. 3 illustrates sine data and cosine data stored in a memory in the configuration illustrated in FIG., 1.

The memory 39 is a nonvolatile memory that stores the sine data d sin and the cosine data d cos, the magnitude of each of which is expressed by 127 (LSB), while one cycle is divided into 64 divisions. Then, as shown in FIG. 3, the corresponding data values are output according to the SAR value having the word length of 6 bits described later.

Thus, the rotation operating part 31 in the comparison example has been described. The X-axis signal X and the Y-axis signal Y have relation to the rotated X-axis signal X' and the rotated Y-axis signal Y' as shown in the following formula (4).

$$\begin{pmatrix} X' \\ Y' \end{pmatrix} = \begin{pmatrix} \cos\left(\frac{2\pi SAR}{64}\right) & \sin\left(\frac{2\pi SAR}{64}\right) \\ -\sin\left(\frac{2\pi SAR}{64}\right) & \cos\left(\frac{2\pi SAR}{64}\right) \end{pmatrix} \begin{pmatrix} X \\ Y \end{pmatrix} \quad (4)$$

An oscillator 15 shown in FIG. 1 outputs a periodic pulse signal, i.e., a clock signal clk.

A frequency divider 16 divides the clock signal clk and outputs a trigger fs.

A search control part 25 includes a sign determination part 26, a sequencer 27 and a sequential comparison register 28. The search control part 25 outputs and changes the register value SAR, and carries out a process of searching for the register value SAR, with which the rotated Y-axis signal Y' comes to have a zero value in an approximation manner, each time the trigger fs comes.

Below, the configuration and operations of the search control part 25 will be described.

The sign determination part 26 determines the sign (i.e., positive or negative) of the rotated Y-axis signal Y' and outputs a sign determination signal sign shown in the formula (5).

$$\text{sign} = \begin{cases} Hi & (Y' \geq 0) \\ Lo & (Y' < 0) \end{cases} \quad (5)$$

The sequential comparison register 28 is a register, the value of which is appropriately rewritten by the sequencer 27 described later, and outputs the value as the register value SAR. In this configuration, the data word length is assumed as 6 bits.

The sequencer 27 carries out an angle search sequence each time the trigger fs comes. The angle search sequence is a process of rewriting the value of the sequential comparison register 28 and fixing the value of the sequential comparison register 28 by using the value of the sign determination signal sign which changes in its value as a result of the rewriting of the value of the sequential comparison register 28.

Below, the operations of the sequencer 27 will be described in detail using FIGS. 4-7 and FIG. 8.

Figure 4:
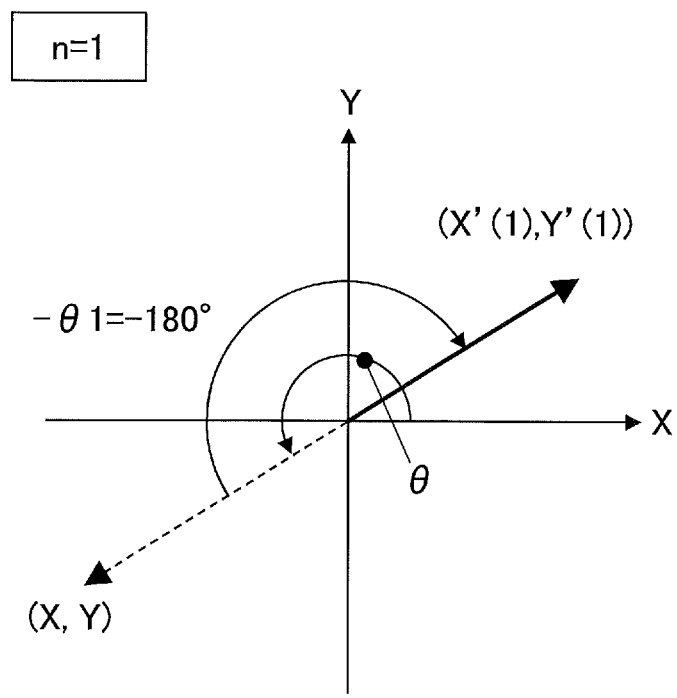
FIGS. 4, 5, 6 and 7 illustrate operations of an angle search sequence in the configuration illustrated in FIG., 1.
Figures 8, 9:
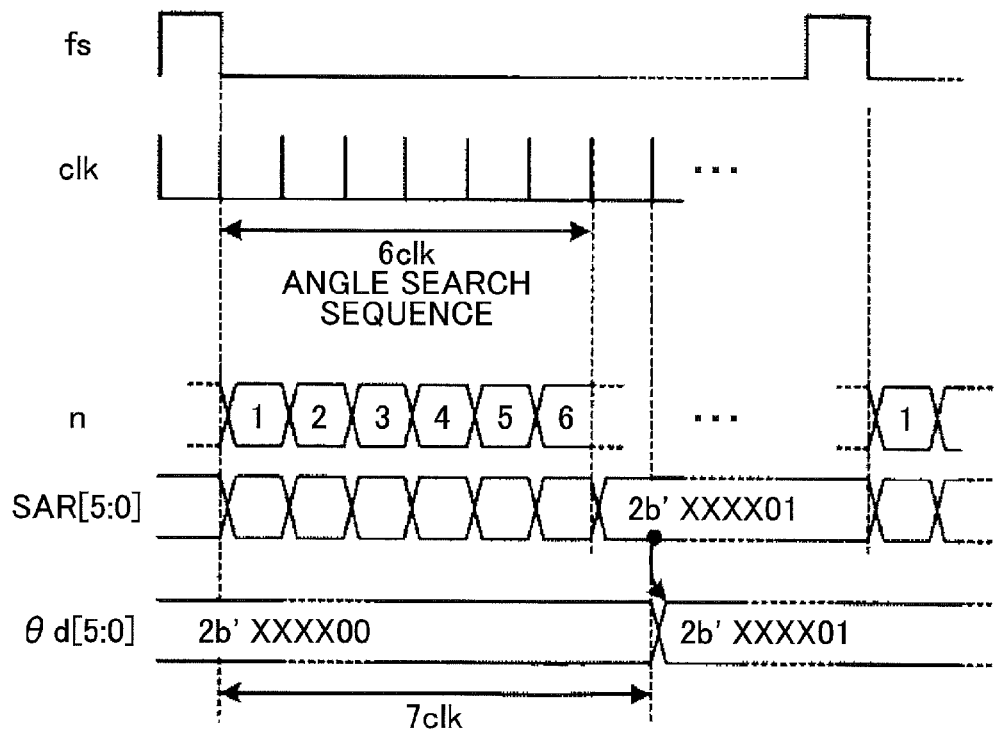
FIG. 8 is a timing chart of the angle search sequence in the configuration illustrated in FIG., 1.
FIG. 9 illustrates a method of generating two-phase pulse signals in the configuration illustrated in FIG., 1.

First, when the trigger fs comes, as shown in FIG. 8, the count is set as n=1, and, as shown in FIG. 4, 1 is set as only the most significant bit (bit5) of the sequential comparison register 28 while 0 is set at all the other bits. Hereinafter, rewriting the value of the sequential comparison register 28 means changing the value of the register value SAR. Since the register value SAR is thus changed, the rotation operating part 31 rotates the vector (X, Y) by θ1=180 degrees clockwise. Assuming the rotated X-axis signal X' and the rotated Y-axis signal Y' as X'(1) and Y'(1), respectively, the sign of Y'(1) is detected from the sign determination signal sign, and the most significant bit of the sequential comparison register 28 is fixed to 1 when the thus detected sign is positive.

Figure 5:
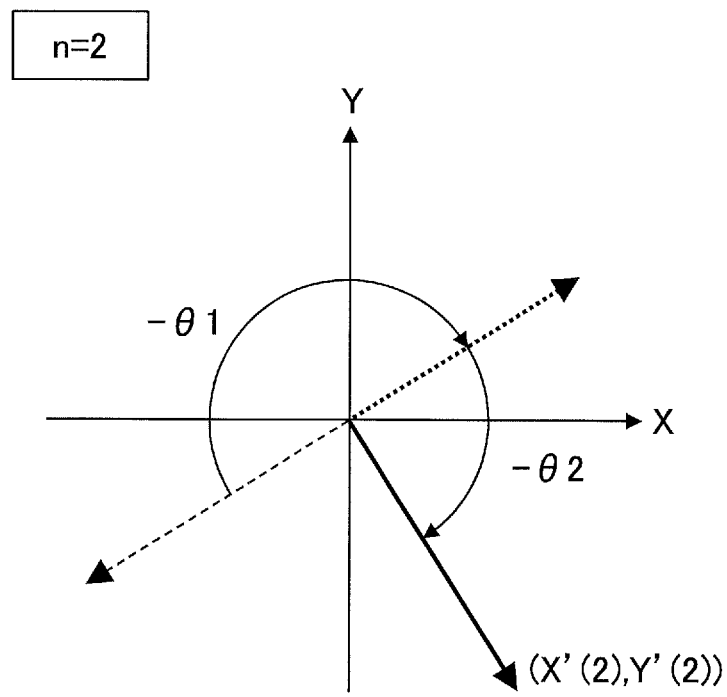

When the next clock signal clk comes, the count is set as n=2, as shown in FIG. 8, and, as shown in FIG. 5, 1 is set as only the second significant bit (bit4) of the sequential comparison register 28. Since "—bit5" is fixed, it is not rewritten. The other bits are not rewritten either. Since the register value SAR is thus changed again, the rotation operating part 31 rotates the vector (X, Y) by θ1+θ2=180 degrees+90 degrees clockwise. Assuming the thus rotated vector as X'(2) and Y'(2), the sign of Y'(2) is detected from the sign determination signal sign, and the second most significant bit "bit4" of the sequential comparison register 28 is fixed to 0 when the thus detected sign is negative.

Figure 6:
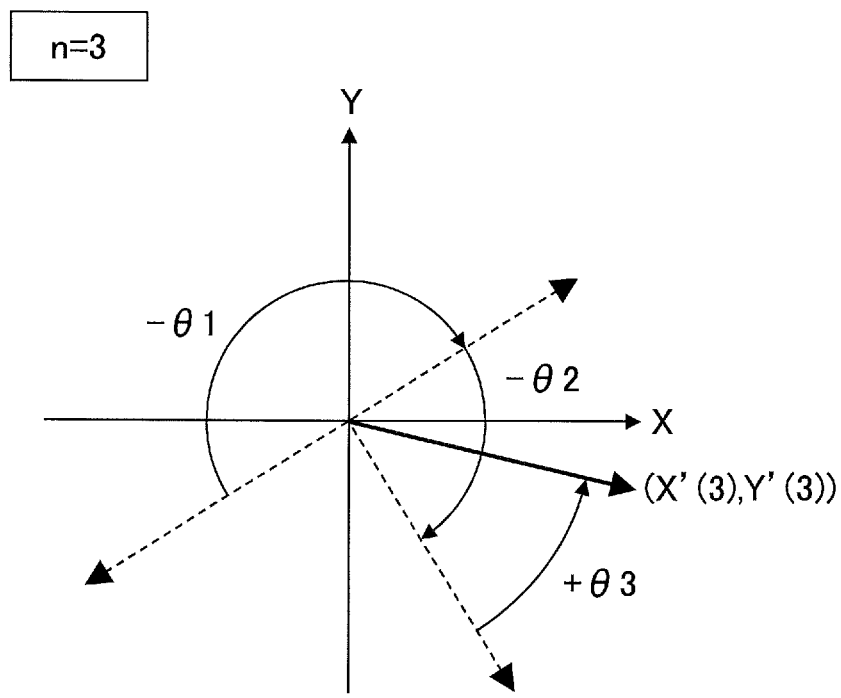

When the further next clock signal clk comes, the count is set as n=3, as shown in FIG. 8, and, as shown in FIG. 6, 1 is set as only the third significant bit (bit3) of the sequential comparison register 28. Since "bit5" is fixed as mentioned above, it is not rewritten. Simultaneously, also "bit4" thus fixed to 0 when the count is n=2 is rewritten to 0. The other bits are not rewritten either. Since the register value SAR is thus changed further again, the rotation operating part 31 rotates the vector (X, Y) by θ1+θ2-θ3=180 degrees+90 degrees-45 degrees clockwise. Assuming the thus rotated vector as X'(3) and Y'(3), the sign of Y'(3) is detected from the sign determination signal sign, and "bit3" of the sequential comparison register 28 is fixed to 0 when the thus detected sign is negative.

Figure 7:
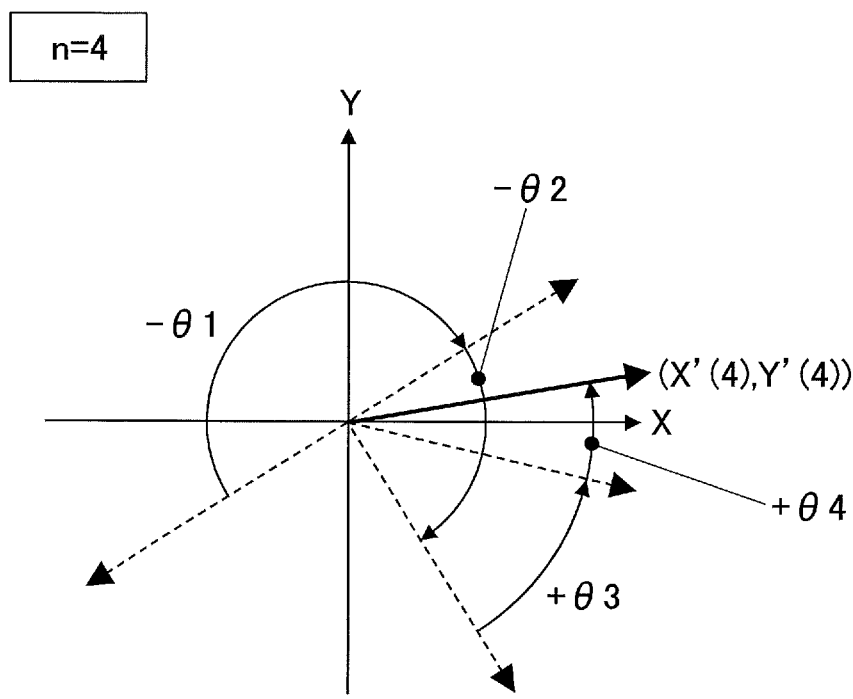

When the yet next clock signal clk comes, the count is set as n=4, as shown in FIG. 8, and, as shown in FIG. 7, 1 is set as the fourth significant bit (bit2) of the sequential comparison register 28. Simultaneously, also "bit3" thus fixed to 0 when the count is n=3 is rewritten to 0. The other bits are not rewritten either. Since the register value SAR is thus changed yet again, the rotation operating part 31 rotates the vector (X, Y) by θ1+θ2-θ3-θ4=180 degrees+90 degrees-45 degrees-22.5 degrees clockwise. Assuming the thus rotated vector as X'(4) and Y'(4), the sign of Y'(4) is detected from the sign determination signal sign, and "bit2" of the sequential comparison register 28 is fixed to 1 when the thus detected sign is positive.

Such a sequence is repeated 6 steps until the count increments from n=1 to n=6. This corresponds to the word length of the sequential comparison register 28, and thus, all the bits are fixed. However, since the last step does not have the next step, a rewriting process is needed when "bit0" of the sequential comparison register 28 is fixed to 0.

Generalizing the above-described process, the rotation angle θn (where n=1, 2, 3, . . . , 6) of the vector (X'(n), Y'(n)) is halved every step, and the rotation direction is such that when the Y-axis component of the rotated vector is positive, the vector is rotated clockwise in the next step, and when the Y-axis component of the rotated vector is negative, the vector is rotated counterclockwise in the next step.

Finally, the vector (X'(n), Y'(n)) is rotated to the angle position nearest to the X-axis. Therefore, the total rotation angle acquired from 6 steps of the angle search sequences can be determined as the angle between the vector (X, Y) and the X-axis to be detected. This is an approximation search algorithm according to a bisection algorithm.

As shown in FIG. 8, in timing the seventh pulse of clock signal clk coming from when the trigger fs comes, the value of the sequential comparison register 28 is loaded as the angle data θd. In other words, in timing of the angle search process being completed, the value of the angle data κ, i.e., the detection value of the rotation angle, is updated.

A pulse generation part 61 of FIG. 1 reads the two least significant bits of the angle data θd ("bit1" and "bit0") and updates two-phase pulse signals Ea and Eb that are output each time the trigger fs comes according to a generating logic shown in FIG. 9. Thus, even without employing an encoder, it is possible to acquire the two-phase pulse signals having the phase difference of a quarter cycle compatible with an encoder.

However, the following situation or so may occur in the angle detection method using the sequential approximation algorithm according to a bisection algorithm disclosed by Patent Reference 1.

Figure 10:
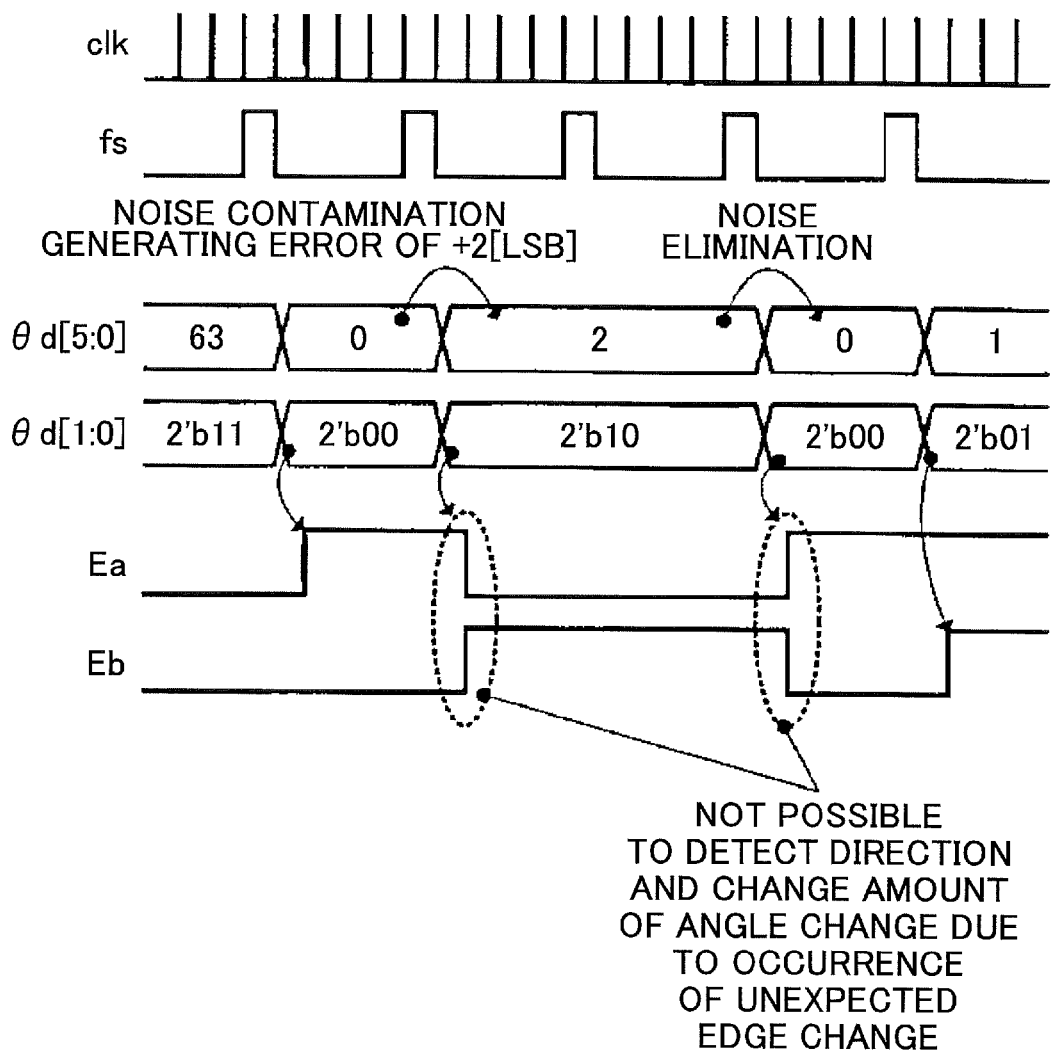
FIG. 10 illustrates an example of an unexpected change which may occur in the two-phase signals in the configuration illustrated in FIG., 1.

That is, in general, one phase of the two-phase pulse signals having the phase difference of a quarter cycle generated based on the detected angle changes at a time, in general. However, if a noise causes a change of the angle data by two counts or more at a time, as shown in FIG. 10, for example, an unexpected situation may occur, i.e., the two-phase pulse signals Ea and Eb may change simultaneously, i.e., the two phases may change at a time. In such a case, there may be a case where it is not possible to detect the change direction and the change amount of the rotation angle (i.e., detect the state of the change) from the Hi/Lo logic changes of the two-phase pulse signals.

An object of the embodiments of the present invention is to provide an angle detection apparatus in which a rotation angle change signal for acquiring a state of a change of a rotation angle of a rotation shaft generated by the angle detection apparatus is robust against (or hardly influenced by) a noise or such.

First Embodiment

Below, an apparatus configuration according to the first embodiment will be described using drawings.

Figure 11:
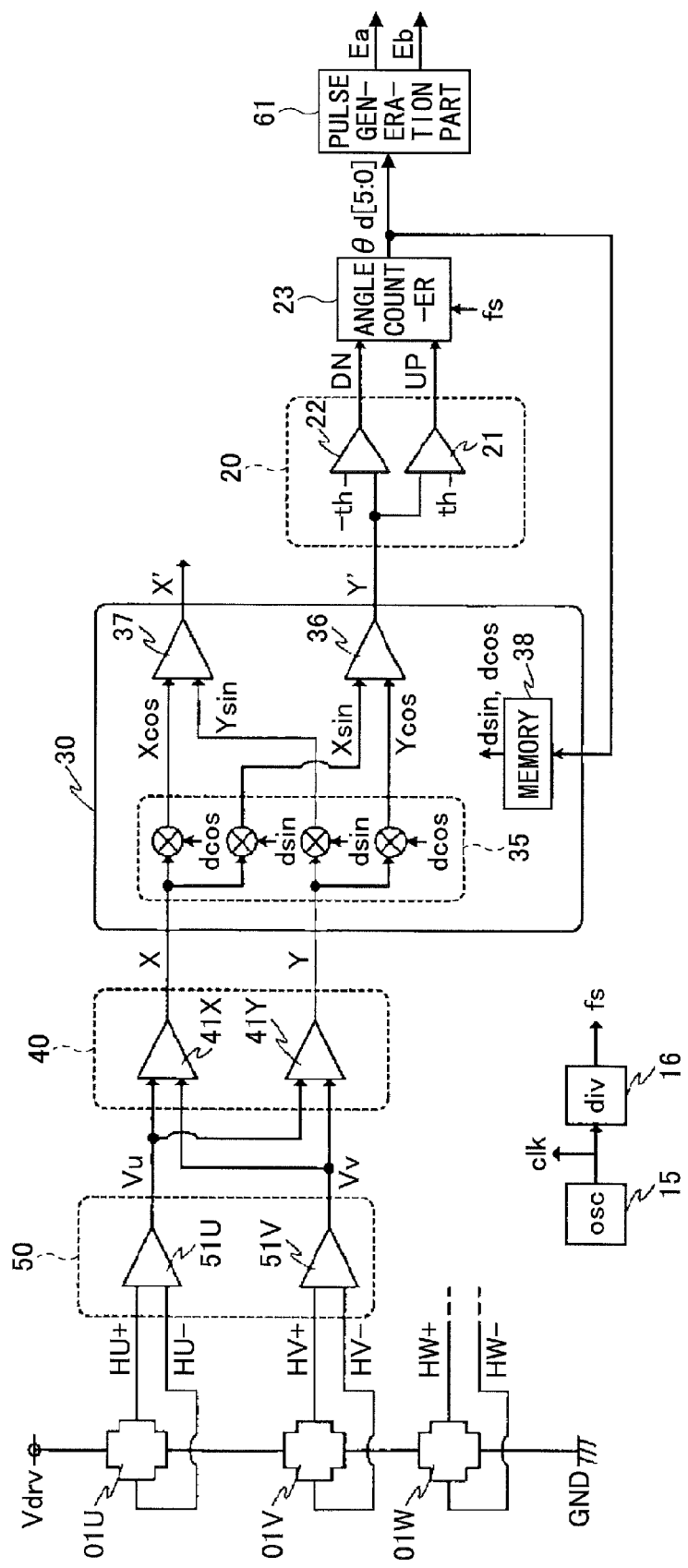
FIG. 11 illustrates an example of a configuration of the entirety of an apparatus according to a first embodiment of the present invention.

FIG. 11 illustrates an example of a configuration of an angle detection apparatus according to the first embodiment of the present invention.

Figure 12:
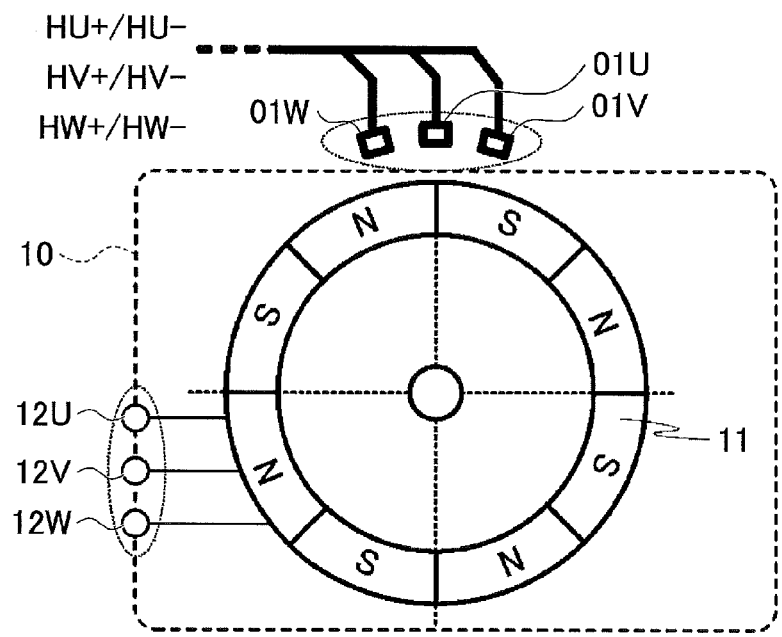
FIG. 12 illustrates an example of a configuration of a brushless motor and an example of installing Hall elements.

A Hall element 01U is a magnetic sensor element installed near a rotor 11 having a permanent magnet of a brushes motor 10 shown in FIG. 12, and includes two pairs of terminals. A driving voltage is applied to one pair thereof while the other pair outputs U-phase differential signals HU+ and HU−. The U-phase differential signals HU+ and HU− are such that the difference therebetween has a sine wave shown in the upper part of the formula (6) below for the rotation angle θ of the rotor 11.

$$\begin{cases} Vu = (HU+) - (HU-) = Au*\sin\left(\theta + \frac{\pi}{3}\right) \\ Vv = (HV+) - (HV-) = Av*\sin\left(\theta - \frac{\pi}{3}\right) \end{cases} \quad (6)$$

The amplitude thereof is in proportion to a coefficient determined by the Hall element sensitivity, the magnetic field strength of the permanent magnet and so forth, and the voltage that drives the Hall element.

A Hall element 01V is installed having the phase difference of 120 degrees from the Hall element 01U, has the same configuration as the Hall element 01U, and outputs V-phase differential signals HV+ and HV−, the difference therebetween having a sine wave shown in the lower part of the formula (6).

A Hall element 01W is installed having the phase difference of 120 degrees from each of the Hall element 01U and the Hall element 01V and has the same configuration as the Hall element 01U. However, according to the first embodiment, the output signals of the Hall element 01W are not used.

The terminal pairs through which the driving voltage is applied to the Hall elements 01U, 01V and 01W, respectively, are connected in series. One end thereof is connected to a driving voltage source Vdrv and the other is connected to the ground GND via a resistor.

Note that the Hall elements 01U and 01V and the differential part 50 are an example of a plurality of sensors.

Since the Hall elements not expensive are thus used, it is possible to provide the angle detection apparatus at low cost.

Next, a configuration and operations of a differential part 50 shown in FIG. 11 will be described.

The differential part 50 includes a U-phase differential amplifier 51U and a V-phase differential amplifier 51V.

The U-phase differential amplifier 51U employs an operational amplifier, functions as a subtractor, carries out a differential operation shown in the upper part of the formula (6) and outputs the operation result as a U-phase sine wave signal Vu.

The V-phase differential amplifier 51V functions as a subtractor the same as the U-phase differential amplifier 51U, carries out a differential operation shown in the lower part of the formula (6) and outputs the operation result as a V-phase sine wave signal Vv.

Note that the differential amplifier 51U and 51V can have such configurations that additional operations such as controlling the amplifications, giving offsets to the centers of the waveforms, and/or the like, may also be carried out.

Figure 13:
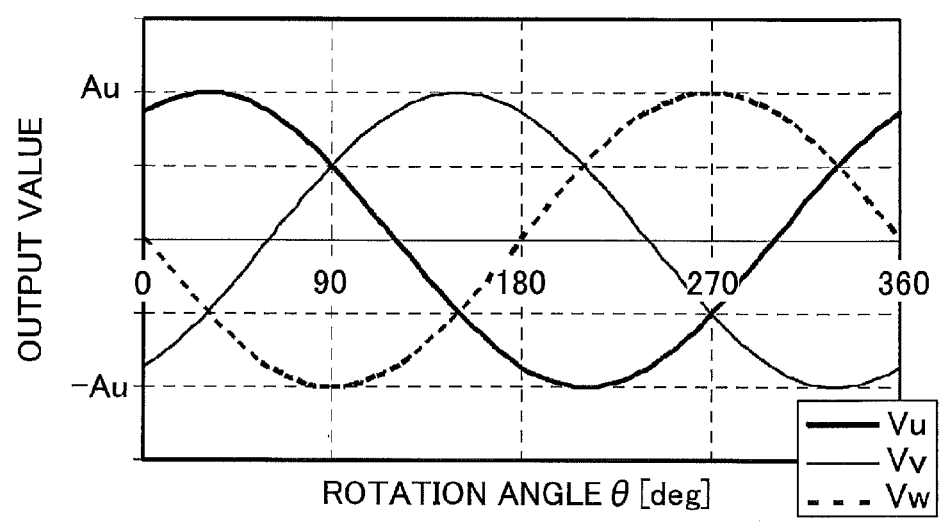
FIG. 13 illustrates one example of sine wave signals at UVW phases in the first embodiment.

Thus, the differential part 50 has been described. The U-phase sine wave signal Vu and the V-phase sine wave signal Vv that are output by the differential part 50 have the phase difference of 120 degrees, and, ideally, have the waveforms shown in FIG. 13 for the rotation angle θ of the rotor 11. However, in the waveforms of FIG. 13, it is assumed, for the sake of simplification, that the sine wave signals Vu and Vv have the same amplitudes.

Next, the configuration and operations of a vector generation part 40 of FIG. 11 will be described.

The vector generation part 40 includes an X-axis generation part 41X and a Y-axis generation part 41Y, and generates an X-axis signal X and a Y-axis signal Y that are two mutually orthogonal signals based on the sine wave signals Vu and Vv.

The X-axis generation part 41X outputs, as the X-axis signal X, the calculation result from multiplying the difference between the sine wave signals Vu and Vv with an amplification as shown in the upper part of the following formula (7):

$$\begin{cases} X = (Vu - Vv)/\sqrt{3} = Au*\cos(\theta) \\ Y = Vu + Vv = Au*\sin(\theta) \end{cases} \text{(when } Au = Av\text{)} \quad (7)$$

The Y-axis generation part 41Y outputs, as the Y-axis signal X, the calculation result from adding the sine wave signals Vu and Vv together as shown in the lower part of the formula (7).

Thus, the configuration of the vector generation part 40 has been described. The operations of the vector generation part 40 correspond to carrying out axis transformation shown in FIG. 15 on the U-phase and V-phase signals, and the X-axis signal X and the Y-axis signal have the mutually orthogonal waveforms shown in FIG. 14 and the formula (7).

In the first embodiment, the mutually orthogonal X-axis signal X and Y-axis signal Y are generated from the two sine wave signals Vu and Vv having the phase difference of 120 degrees. However, as long as two mutually orthogonal signals can be acquired, they can be generated from two or more sine wave signals through subtraction and/or addition operations. Further, if the sine wave signals Vu are Vv originally orthogonal to one another, they can be output as they are as the X-axis signal X and the Y-axis signal Y, and thus, the vector generation part 40 can be omitted.

Thus, the vector generation part 40 has been described.

Note that the vector generation part 40 in the first embodiment is one example of a vector generation part, and the X-axis signal X and the Y-axis signal Y in the first embodiment are examples of signals expressing a vector.

Next, the configuration and operations of a rotation calculation part 30 of FIG. 11 will be described.

The rotation calculation part 30 includes a multiplication part 35, a Y-axis subtraction part 36, an X-axis addition part 37 and a memory 38. The rotation calculation part 30 carries out a rotation transform on the vector expressed by the X-axis signal X and the Y-axis signal Y according to the value of angle data θd described later, and outputs a rotated vector expressed by the rotated X-axis signal X' and the rotated Y-axis signal Y' that are the calculation results.

The multiplication part 35 multiplies, as shown in the following formula (8), the X-axis signal X and the Y-axis signal Y with sine data d sin and cosine data d cos described later, respectively, and outputs, as the calculation results, X sin, X cos, Y sin and Y cos.

$$\begin{cases} X\sin = X*d\sin \\ Y\cos = Y*d\cos \\ X\cos = X*d\cos \\ Y\sin = Y*d\sin \end{cases} \quad (8)$$

The Y-axis subtraction part 36 executes the subtraction shown in the lower part of the following formula (9) and outputs the calculation result as the rotated Y-axis signal Y'.

$$\begin{cases} X' = X\cos + Y\sin \\ Y' = -X\sin + Y\cos \end{cases} \quad (9)$$

The X-axis addition part 37 executes the addition shown in the upper part of the formula (9) and outputs the calculation result as the rotated X-axis signal X'. However, in the first embodiment, the rotated X-axis signals X' is not used.

Note that the above-mentioned operations carried out by the multiplication part 35, the Y-axis subtraction part 36 and the X-axis addition part 37 are an example of a sum-of-product operation, and the sine data d sin and the cosine data d cos are an example of data representing reference sine waves.

Figure 16:
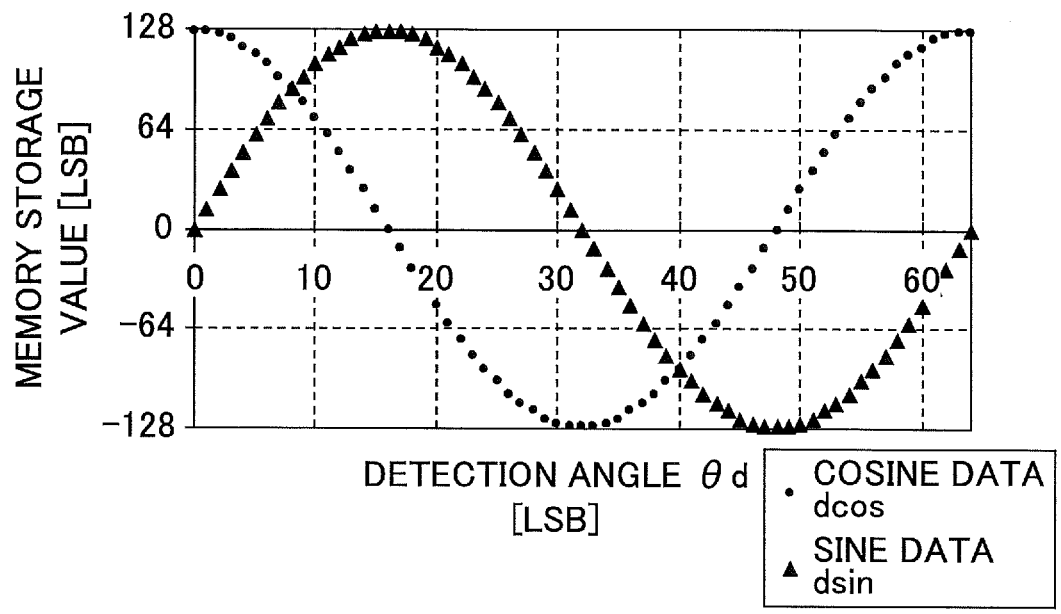
FIG. 16 illustrates one example of sine data and cosine data stored in a memory.

The memory 38 is a nonvolatile memory stores the sine data d sin and the cosine data d cos, each of which is expressed in such a manner that one cycle is divided into 64 divisions and the amplitude is expressed by 127 [LSB]. As shown in FIG. 16, the memory 38 outputs respective data values according to the value of angle data θd having the word length of 6 bits.

Thus, the rotation calculation part 30 has been described. The X-axis signal X and the Y-axis signal Y have the relationship with the rotated X-axis signal X' and the rotated Y-axis signal Y' shown in the following formula (10).

$$\begin{pmatrix} X' \\ Y' \end{pmatrix} = \begin{pmatrix} \cos\left(\frac{2\pi\theta d}{64}\right) & \sin\left(\frac{2\pi\theta d}{64}\right) \\ -\sin\left(\frac{2\pi\theta d}{64}\right) & \cos\left(\frac{2\pi\theta d}{64}\right) \end{pmatrix} \begin{pmatrix} X \\ Y \end{pmatrix} \quad (10)$$

Note that the rotation calculation part 30 in the first embodiment is one example of a vector rotation part.

Next, the configuration and operations of a sign determination part 20 of FIG. 11 will be described.

The sign determination part 20 includes an upper determination part 21 and a lower determination part 22. The sign determination part 20 determines whether the rotated vector expressed by the rotated X-axis signal X' and the rotated Y-axis signal Y' is above or below dead zones having the widths of 2×th provided in such a manner that the dead zones sandwich the X-axis (Y'=0) that is the rotation target. The sign determination part 20 outputs the determination result as an upper determination signal UP and a lower determination signal DN.

Note that the upper determination signal UP and the lower determination signal DN are an example of a rotation amount determination signal.

The upper determination signal UP is output as Hi when the rotated Y-axis data Y' is greater than or equal to the positive-side dead zone width (+th), as shown in the following formula (11).

$$UP = \begin{cases} Hi & (Y' \geq th) \\ Lo & (Y' < th) \end{cases} \quad (11)$$

The lower determination signal DN is output as Hi when the rotated Y-axis data Y' is less than or equal to the negative-side dead zone width (−th), as shown in the following formula (12).

$$DN = \begin{cases} Hi & (Y' \leq -th) \\ Lo & (Y' > -th) \end{cases} \quad (12)$$

Note that the sign determination part 20 is one example of a comparison part. The upper determination signal UP and the lower determination signal DN are an example of an angle determination signal.

Thus, the sign determination part 20 has been described.

The oscillator 15 outputs a clock signal clk that is a periodic pulse signal.

The frequency divider 16 divides the frequency of the clock signal clk and outputs a trigger fs.

Next, operations of an angle counter 23 of FIG. 11 will be described using FIG. 18.

Whenever the trigger fs comes, the angle counter 23 increments the angle data θd by one if the upper determination signal UP has the logic Hi, decrements the angle data θd by one if the upper determination signal DN has the logic Hi, and outputs the angle data θd. Due to the setting of the upper reference value (+th) and the lower reference value (−th), the two determination signals UP and DN are avoided to have the logic Hi simultaneously.

The angle data θd is a detection value of the rotation angle of the rotor 11 by the angle detection apparatus, and, in the first embodiment, is an iteration count having the word length of 6 bits.

Thus, the angle counter 23 has been described.

Note that the angle counter 23 is one example of a rotation angle determination part.

Further, the rotation calculation part 30, the sign determination part 20 and the angle counter 23 are one example of an angle search part.

Thus, the rotation calculation part 30, the sign determination part 20 and the angle counter 23 are included, and thereby, the following operations are carried out. That is, the rotated vector expressed by the rotated X-axis signal X' and the rotated Y-axis signal Y' operates as follows. That is, the rotated vector rotated every count from the position of the original vector expressed by the X-axis signal X and the Y-axis signal Y toward the X-axis (a predetermined phase) that is the target, and, after it rotates to the proximity of the X-axis, it continuously follows the X-axis.

The rotation amount from the original vector to the rotated vector is the angle data θ, and is the detection value of the rotation angle θ of the rotor 11.

Figure 17:
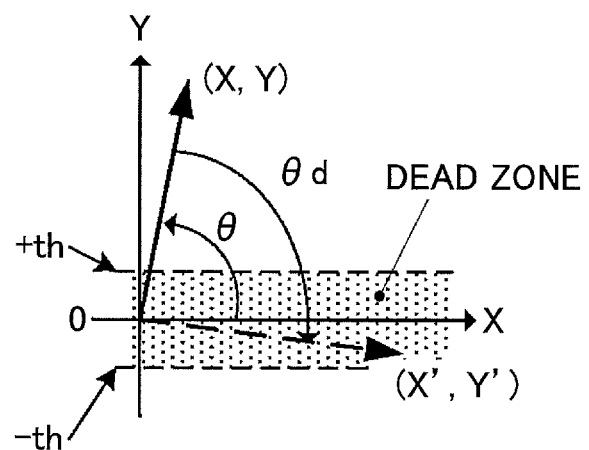
FIG. 17 illustrates following to an X-axis due to a rotation of a vector and a dead zone in the first embodiment.

Note that in the configuration of the sign determination part 20 according to the first embodiment, due to providing the dead zones near the X-axis as shown in FIG. 17, it is possible to avoid chattering such as repetitions of the angle data θd moving up and down every time of the sampling period.

Figures 18, 19:
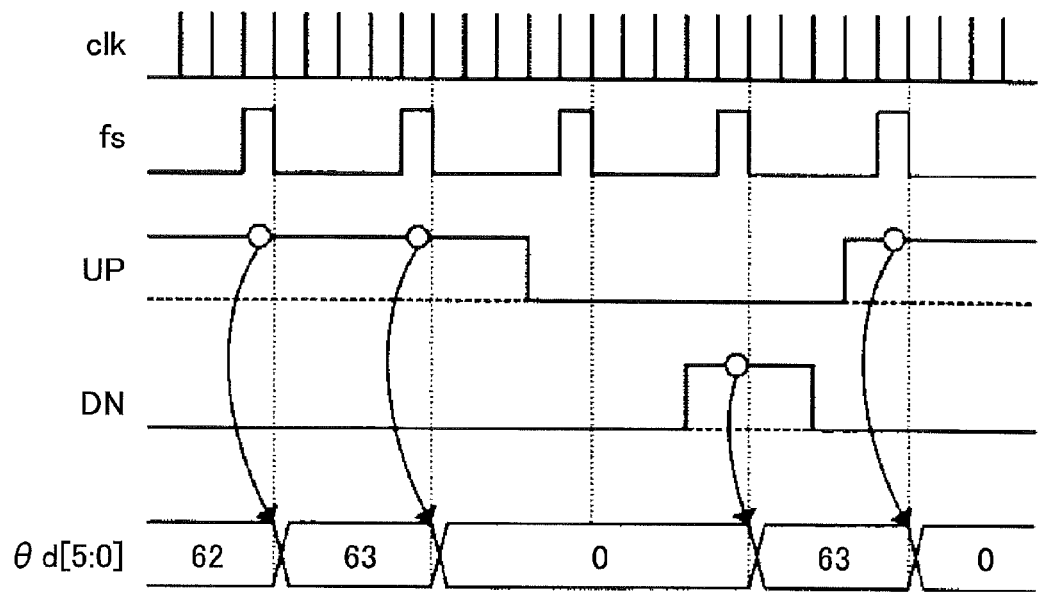
FIG. 18 is a timing chart illustrating one example of an operation of an angle counter in the first embodiment.
FIG. 19 illustrates a method of generating pulse signals in the first embodiment.
Figure 20:
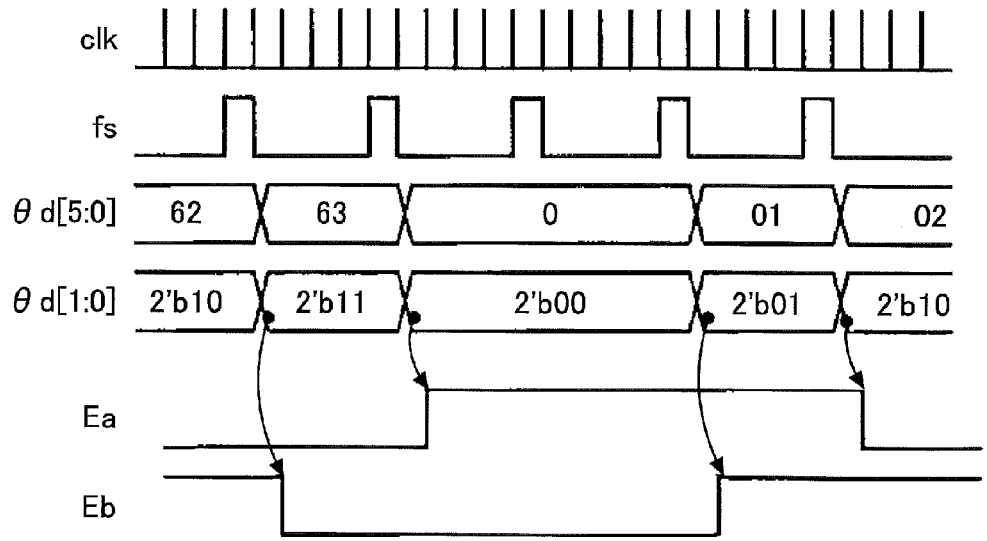
FIG. 20 is a timing chart illustrating one example of an operation of generating the pulse signals in the first embodiment.

A pulse generation part 61 of FIG. 11 reads the two least significant bits of the angle data θd, and updates the two-phase pulse signals Ea and Eb to be output every time the trigger fs comes as shown in FIG. 20 according to a generating logic shown in FIG. 19. Thus, even without employing an encoder, it is possible to acquire the two-phase pulse signals having the phase difference of a quarter cycle compatible with an encoder.

Note that the pulse generation part 61 in the first embodiment is one example of a rotation angle change signal generation part.

Thus, the angle detection apparatus in the first embodiment has been described. In such a rotation detection apparatus, a vector is generated based on mutual calculation of the output signals of Hall elements that output a plurality of sine wave signals having different phases changing in a sine wave manner due to the rotation angle of a motor. Then, by using a rotation transform of the vector, the rotation angle of the motor is detected. As a result, even in a case where the phase difference between sine waves that are output from a plurality of sensors is not 90 degrees (see FIG. 15), it is possible to detect the rotation angle of a rotor without employing an optical encoder or so that is expensive.

Further, the configuration is provided such that, based on the value of the detected angle data, the two-phase pulse signals are generated. As a result, it is possible to acquire the signals (the rotation angle change signals) indicating the rotation direction and the rotation amount of the rotation shaft without employing an optical encoder or such that is expensive. Thus, it is possible to provide the apparatus at low cost.

Thus, the angle detection apparatus in the first embodiment has been described. One advantageous effect of the first embodiment of the present invention will now be described using FIGS. 10 and 21.

In the related art, as shown in FIG. 10, for example, as described above, when a noise is contaminated such as generating an error of +2 [LSB] in the angle data θd, the angle data θd changes by +2 [LSB] in subsequent angle detection timing. At this time, in two-phase pulse signals Ea and Eb normally having the logics of Hi/Lo changed phase by phase and thus expressing the direction of a change and the change amount (i.e., a state of the change), the two phases of the signals Ea and Eb change simultaneously. As a result, it may be impossible to properly detect the angle data θd from the changes of the two-phase pulse signals.

Figure 21:
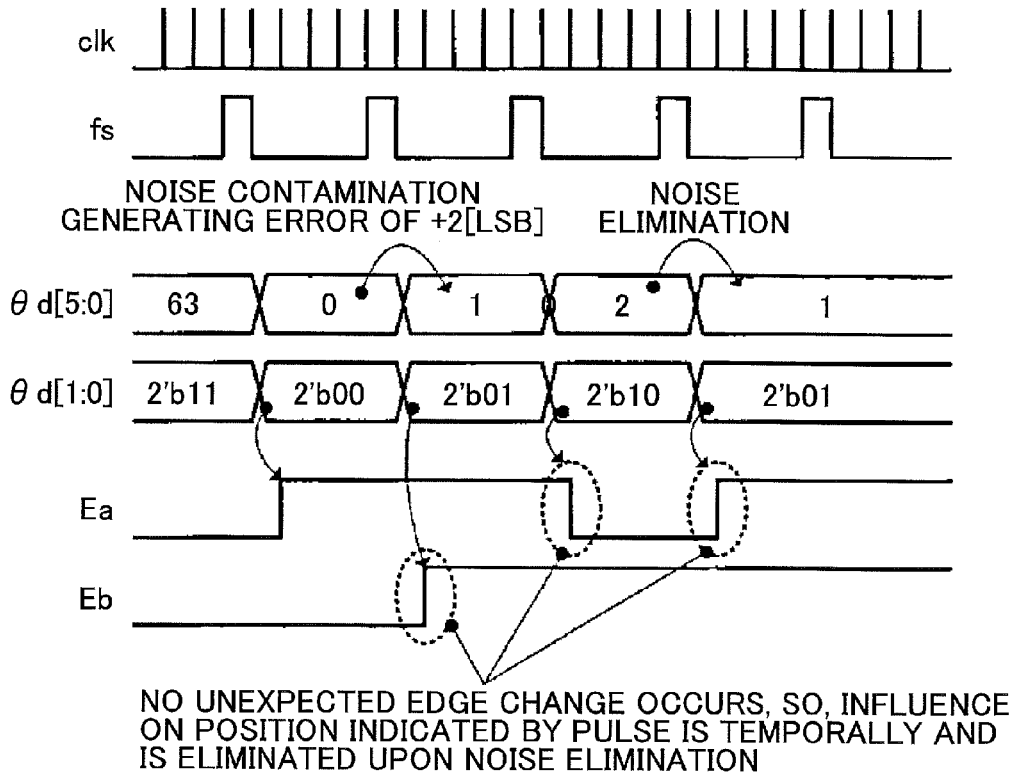
FIG. 21 illustrates an advantageous effect of the first embodiment.

In contrast thereto, according to the first embodiment, as shown in FIG. 21, even when an equivalent noise as FIG. 10 is contaminated, the angle data θd changes by 1 [LSB] (a fixed amount) every time. Therefore, the two-phase pulse signals Ea and Eb are avoided to change simultaneously. As a result, it is possible to continuously detect the direction of a change and the change amount (a state of the change) from a logic change of the two-phase pulse signals. Although the value of the angle data θd may be disturbed temporarily, the value returns to the proper one after the noise is gone, and thus, it is possible to carry out angle detection without fail. Note that the two-phase pulse signals are one example of a rotation angle change signal.

Thus, according to the first embodiment, even in a case where a large error occurs in a detection of the rotation angle of a rotor due to noise contamination to a signal(s) expressing a vector or such, an abnormal change in the rotation angle change signal is avoided. As a result, it is possible to properly detect a change in the rotation angle based on a change in the rotation angle change signal.

Further, as will be described later, in the circuit configuration of FIG. 11, it is possible to replace the pulse generation part 61 by a pulse generation part 62 shown in FIG. 22. In this case, even when a large error is generated in a detection of the rotation angle due to a noise contamination to a signal expressing a vector or such, it is possible to avoid an abnormal change in a binary signal and a pulse signal described later. Therefore, it is possible to properly detect a change in the rotation angle based on a change in the binary signal and the pulse signal.

Furthermore, as will be described later, in the circuit configuration of FIG. 11, it is possible to replace the pulse generation part 61 by a pulse generation part 63 shown in FIG. 24. In this case, even when a large error is generated in a detection of the rotation angle due to a noise contamination to a signal expressing a vector or such, it is possible to avoid an abnormal change in a first pulse signal and a second pulse signal described later. Therefore, it is possible to properly detect a change in the rotation angle based on a change in the first pulse signal and the second pulse signal.

Second Embodiment

Below, the apparatus configuration of the second embodiment will be described using FIGS. 22 and 23. The duplicate description to the first embodiment will be omitted.

The configuration except the pulse generation part 62 is the same as the first embodiment.

Figure 22:
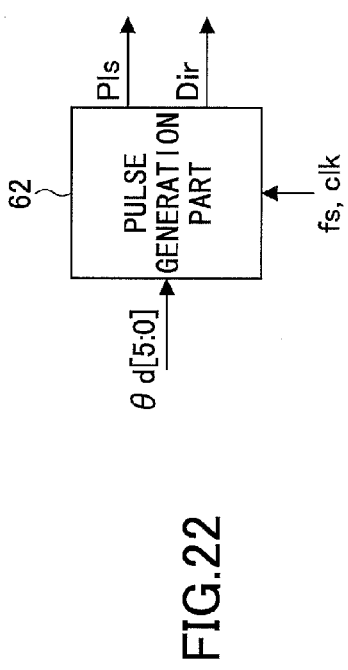
FIG. 22 illustrates one example of a pulse generation part in a second embodiment of the present invention.

As shown in FIG. 22, the pulse generation part 62 generates the pulse signal Pls indicating a change amount of the rotation angle and a directional signal Dir indicating the direction of the change of the rotation angle based on the angle data θd.

Below, the respective signals will be described.

The trigger fs is the same as in the first embodiment.

The pulse signal Pls has pulses each having a predetermined width. The number of the pulses thereof corresponds to the number of times the value of the angle data θd changes. As shown in FIG. 23, the pulse is output or is not output every time the trigger fs comes. In other words, the number of pulses represents a change amount of the rotation angle.

Figure 23:
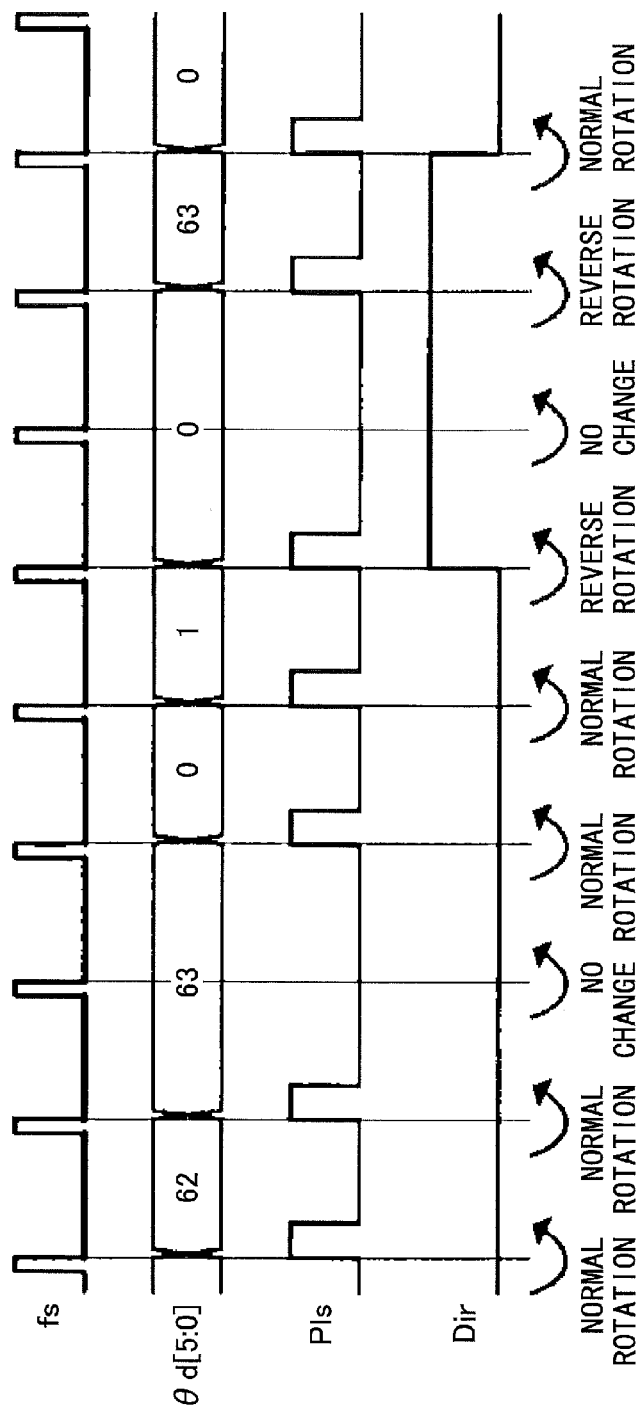
FIG. 23 is a timing chart illustrating one example of an operation of the pulse generation part in the second embodiment.

Every time the trigger fs comes, the direction signal Dir has Lo when the value of the angle data θd increases and has Hi when the value of the angle data θd decreases, as shown in FIG. 23. If the value of the angle data θd is kept unchanged, the signal Dir is kept unchanged. An increase in the angle data indicates a change of the rotation angle in a normal rotation direction and a decrease in the angle data indicates a change of the rotation angle in a reverse rotation direction. That is, the Hi/Lo logics indicate the directions of a change of the rotation angle.

It is assumed that the value of the angle data θd changes by a large amount. In this case, if an output of pulses, the number of which corresponds to the number of times the value of the angle data θd changes, is not completed until the subsequent trigger fs comes, it may be impossible to properly detect the change of the rotation angle based on the changes in the pulse signal Pls and the binary signal (i.e., the direction signal Dir).

However, according to the second embodiment, as in the first embodiment, the angle data θd changes only 1 [LSB] (the fixed amount) every time the trigger fs comes. Therefore, the number of pulses to be output within the trigger fs coming period is one or less. Therefore, merely by setting the trigger fs coming period to be longer than the pulse width of the pulse signal, it is possible to properly detect a change in the rotation angle based on changes in the pulse signal and the binary signal.

Therefore, it is not necessary to consider an influence due to a change of the angle data θd by two counts or more due to a noise or such.

Note that the direction signal Dir is one example of a binary signal. The pulse signal Pls and the direction signal Dir are one example of a rotation angle change signal.

Thus, the pulse generation part 62 has been described.

Note that the pulse generation part 62 in the second embodiment is one example of a rotation angle change signal generation part.

Thus, the angle detection apparatus in the second embodiment has been described. Also in the second embodiment, in the same manner as the first embodiment, a vector is generated based on mutual calculation of the output signals of Hall elements that output a plurality of sine wave signals having different phases changing in a sine wave manner due to the rotation angle of a motor. Then, by using a rotation transform of the vector, the rotation angle of the motor is detected. As a result, even in a case where the phase difference between sine waves that are output from a plurality of sensors is not 90 degrees, it is possible to detect the rotation angle of a rotor without employing an optical encoder or so that is expensive.

According to the second embodiment, based on the value of the detected angle data, the pulse signal indicating a change amount of the rotation angle and the directional signal indicating the direction of the change are generated. As a result, it is possible to acquire the signals indicating the rotation direction and the rotation amount (the manner of a change of the rotation angle) of the rotation shaft without employing an optical encoder or such that is expensive. Thus, it is possible to provide the apparatus at low cost.

Further, according to the second embodiment, even in a case where a large error occurs in a detection of the rotation angle of a rotor due to noise contamination to a signal(s) expressing a vector or such, an abnormal change in the rotation angle change signal is avoided. As a result, it is possible to properly detect a change in the rotation angle based on a change in the rotation angle change signal.

Third Embodiment

Below, the apparatus configuration of the third embodiment will be described using FIGS. 24 and 25. The duplicate description to the first embodiment will be omitted.

The configuration except the pulse generation part 63 is the same as the first embodiment.

Figure 24:
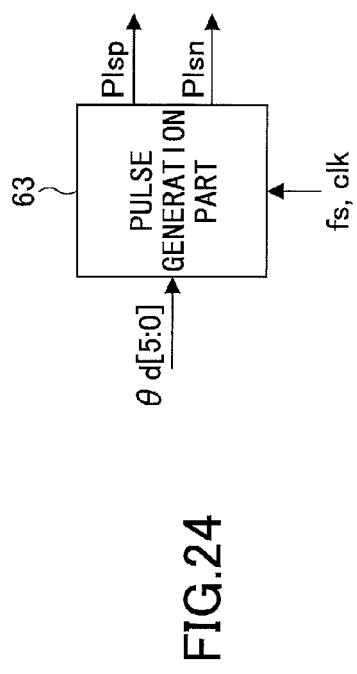
FIG. 24 is a timing chart illustrating one example of an operation of a pulse generation part in in a third embodiment of the present invention.
Figure 25:
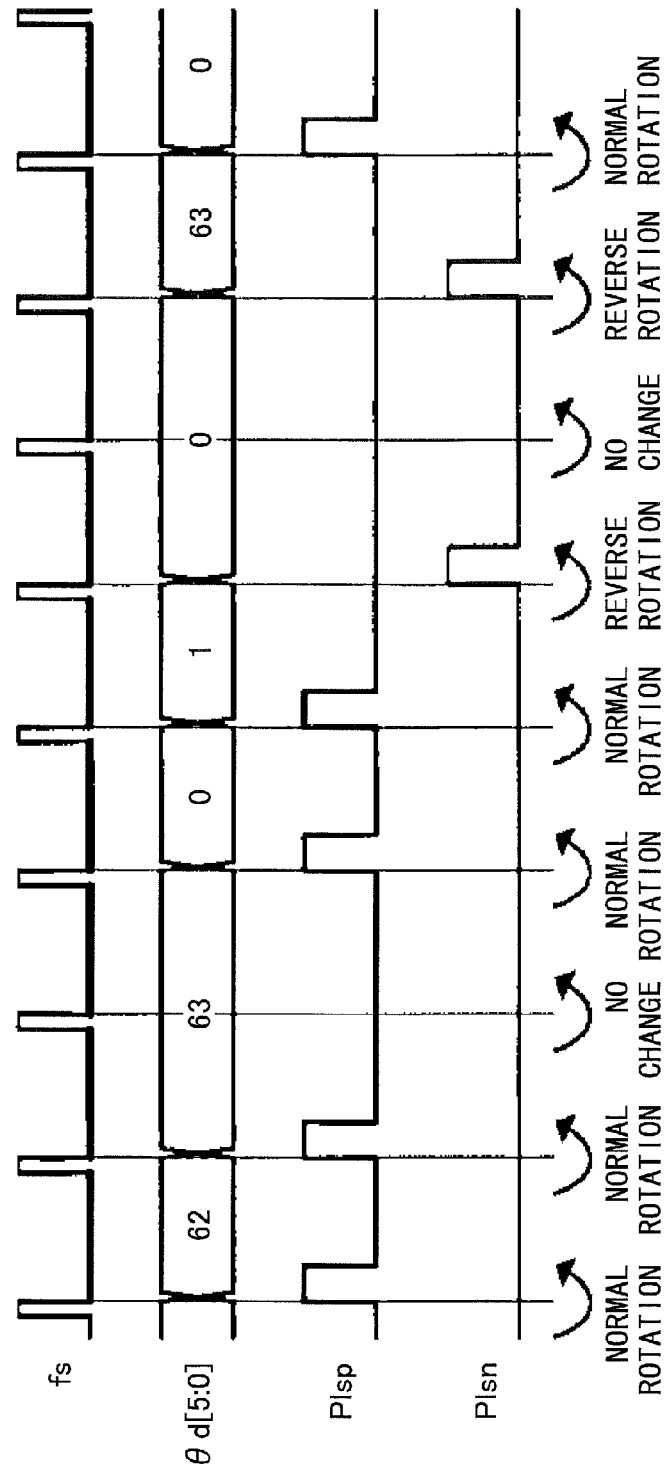
FIG. 25 is a timing chart illustrating one example of a method of generating the pulse signals in the third embodiment.

As shown in FIG. 24, the pulse generation part 63 generates a positive direction pulse signal Plsp indicating an increase amount of the rotation angle and a negative direction pulse signal Plsn indicating a decrease amount of the rotation angle based on the angle data θd.

Below, the respective signals will be described.

The trigger fs is the same as in the first embodiment.

The positive direction pulse signal Plsp has pulses each having a predetermined width, the number of which corresponds to the number of times the value of the angle data θd is increased. The pulse is output or is not output every time the trigger fs comes, as shown in FIG. 25. If the value of the angle data θd is kept unchanged or decreased, the positive direction pulse signal has no pulse. In other words, the number of pulses represents a change amount of the rotation angle in the normal direction.

The negative direction pulse signal Plsn has pulses each having a predetermined width, the number of which corresponds to the number of times the value of the angle data θd is decreased. The pulse is output or is not output every time the trigger fs comes. If the value of the angle data θd is kept unchanged or increased, the negative direction pulse signal has no pulse. In other words, the number of pulses represents a change amount of the rotation angle in the reverse direction.

It is assumed that the value of the angle data θd changes by a large amount. In this case, if an output of pulses, the number of which corresponds to the number of times the angle data θd is changed is not completed until the subsequent trigger fs comes, it may be impossible to properly detect the change of the rotation angle based on the changes in the two pulse signals.

However, according to the third embodiment, as in the first embodiment, the angle data θd changes only 1 [LSB] (the fixed amount) every time the trigger fs comes. Therefore, the number of pulses to be output within the trigger fs coming period is one or less. Therefore, merely by setting the trigger fs coming period to be longer than the pulse width of each pulse signal, it is possible to properly detect a change in the rotation angle based on changes in the two pulse signals.

Therefore, it is not necessary to consider an influence due to a change of the angle data θd by two counts or more due to a noise or such.

Note that the positive direction pulse signal Plsp and the negative direction pulse signal Plsn are one example of a first pulse signal and a second pulse signal, respectively, and are an example of a rotation angle change signal.

Thus, the pulse generation part 63 has been described.

Note that the pulse generation part 63 in the third embodiment is one example of a rotation angle change signal generation part.

Thus, the angle detection apparatus in the third embodiment has been described. Also in the third embodiment, in the same manner as the first embodiment, a vector is generated based on mutual calculation of the output signals of Hall elements that output a plurality of sine wave signals having different phases changing in a sine wave manner due to the rotation angle of a motor. Then, by using a rotation transform of the vector, the rotation angle of the motor is detected. As a result, even in a case where the phase difference between sine waves that are output from a plurality of sensors is not 90 degrees, it is possible to detect the rotation angle of a rotor without employing an optical encoder or so that is expensive.

Also, based on the value of the detected angle data, the positive direction pulse signal indicating a change amount of the rotation angle in the normal direction and the negative direction pulse signal indicating a change amount of the rotation angle in the reverse direction are generated. As a result, it is possible to acquire the signals indicating the rotation direction and the rotation amount of the rotation shaft without employing an optical encoder or such that is expensive. Thus, it is possible to provide the apparatus at low cost.

Also, according to the third embodiment, even in a case where a large error occurs in a detection of the rotation angle of a rotor due to noise contamination to a signal(s) expressing a vector or such, an abnormal change in the rotation angle change signal is avoided. As a result, it is possible to properly detect a change in the rotation angle based on a change in the rotation angle change signal.

Fourth Embodiment

Below, the apparatus configuration of the fourth embodiment will be described using FIGS. 26 and 27. The duplicate description to the first embodiment will be omitted.

Figure 26:
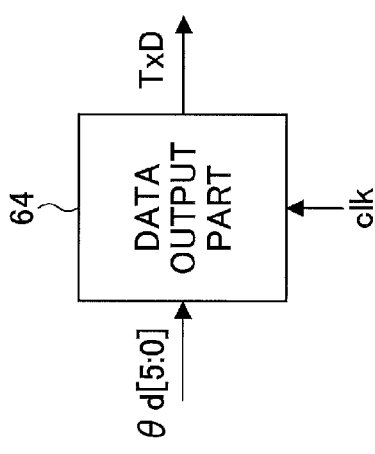
FIG. 26 illustrates one example of a data output part in a fourth embodiment of the present invention.

The fourth embodiment has the same configuration as the first embodiment, and further, a data output part 64 shown in FIG. 26 is included.

Note that the data output part 64 can be included also in each of the second, third, fifth and sixth embodiments in the same manner as the fourth embodiment.

The data output part 64 converts the angle data θd into a serial form and outputs it as a single serial data signal TxD.

Figure 27:
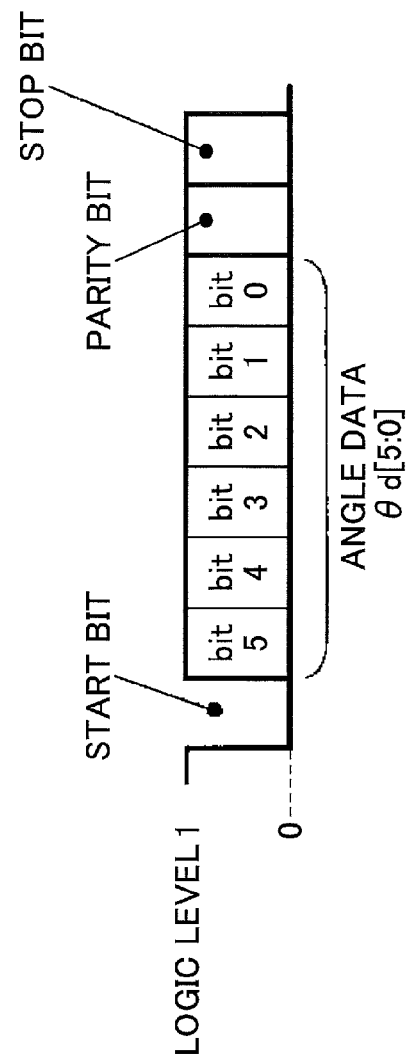
FIG. 27 illustrates one example of a serial data signal in the fourth embodiment.

The serial data signal TxD is of a start-stop synchronization system, and therefore, as shown in FIG. 27, first transmits a start bit, then transmits the angle data θd, bit by bit, in sequence, then transmits a parity bit and finally, transmits a stop bit. Such a manner of data transmission is periodically repeated.

The parity bit is a simple error detection code. For example, in an even parity system, "0" is set to the parity bit when the number of the "1" bits included in the angle data θd is an even number, while "1" is set to the parity bit when the number of the "1" bits included in the angle data θd is an odd number. Thereby, on the reception side, the received "1" bits are counted, the count result is compared with the received parity bit, and an error determination is made when the comparison result is in "disagreement". Thus, a communication error can be detected. Note that it is also possible that no parity bit is added.

The period for each bit of the serial data signal TxD is a predetermined period acquired from dividing the frequency of the clock signal clk.

Note that the serial data signal is not limited to the method of the fourth embodiment, and any other data format can be applied instead.

Thus, the data output part 64 has been described.

The data output part 64 is one example of a data conversion part.

Thus, the angle detection apparatus in the fourth embodiment has been described. Here, the detected angle data is output after being converted into a serial form. Thereby, in addition to the advantageous effects of the first embodiment, it is possible to output the angle data (the value of the rotation angle) detected without employing an optical encoder by a reduced number of signal lines. Thus, it is possible to provide the apparatus at low cost.

Fifth Embodiment

Figure 28:
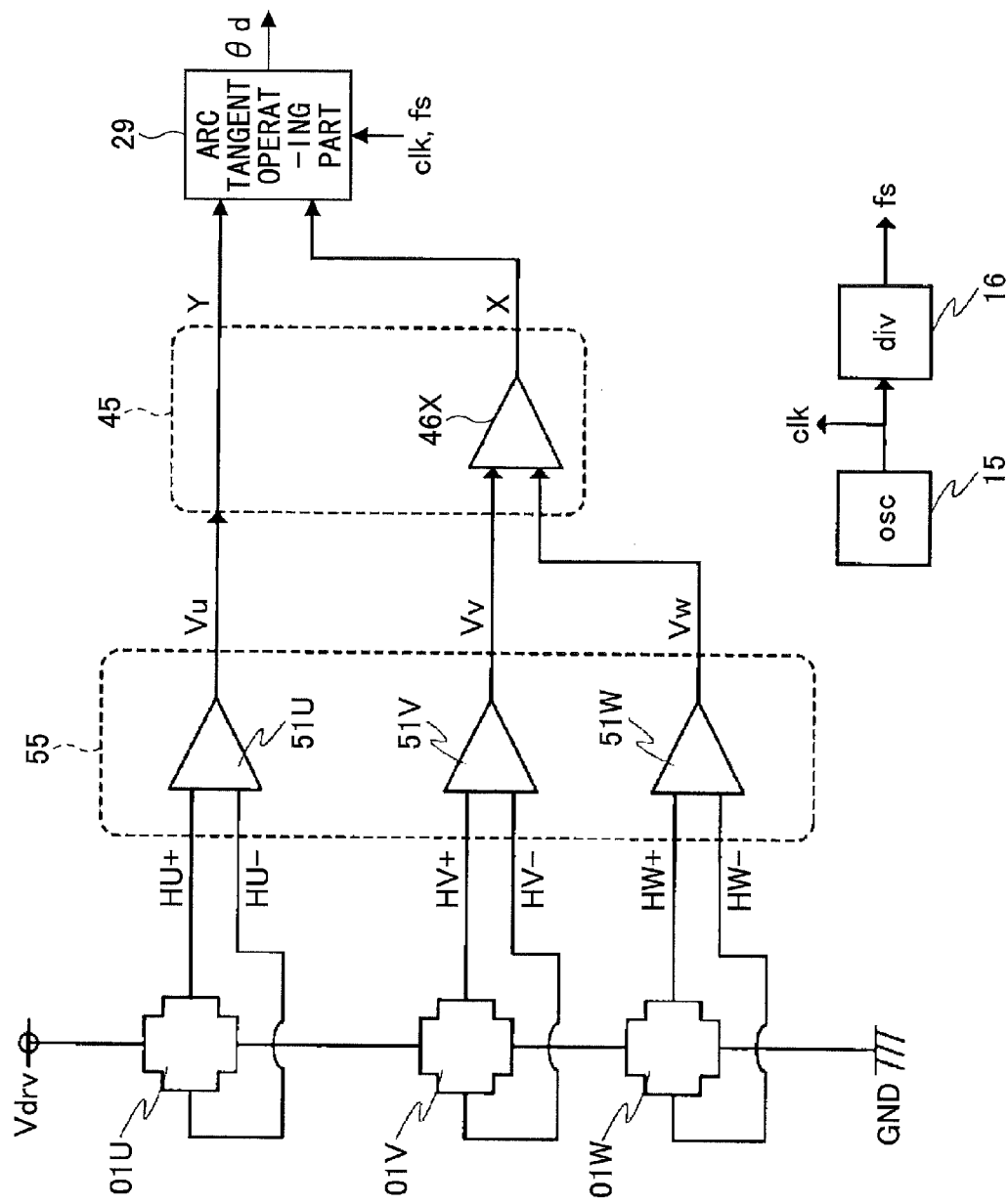
FIG. 28 illustrates an example of a configuration of the entirety of an apparatus according to a fifth embodiment of the present invention.

Below, the apparatus configuration of the fifth embodiment will be described using FIG. 28. The duplicate description to the first embodiment will be omitted.

The Hall elements 01U, 01V and 01W are the same as those in the first embodiment. However, the respective differences between the differential signals HU+, HU−, HV+, HV−, HW+ and HW− are as shown in the following formula (13) and have the waveforms shown in FIG. 29.

$$\begin{cases} Vu = (HU+) - (HU-) = Au * \sin(\theta) \\ Vv = (HV+) - (HV-) = Av * \sin\left(\theta - \frac{2\pi}{3}\right) \\ Vw = (HW+) - (HW-) = Aw * \sin\left(\theta + \frac{2\pi}{3}\right) \end{cases} \quad (13)$$

Note that the Hall elements 01U, 01V and 01W and the differential part 50 in the fifth embodiment are an example of a plurality of sensors.

Next, the configuration and operations of a differential part 55 shown in FIG. 28 will be described.

The differential part 55 includes a U-phase differential amplifier 51U, a V-phase differential amplifier 51V and a W-phase differential amplifier 51W.

The U-phase differential amplifier 51U and the V-phase differential amplifier 51V are the same as those in the first embodiment.

The W-phase differential amplifier 51W is a subtractor using an operational amplifier, carries out the differential operation shown in the lower part of the formula (13) and outputs the operation result as a W-phase sine wave signal Vw.

Thus, the differential part 55 has been described. The U-phase sine wave signal Vu, the V-phase sine wave signal Vv and the W-phase sine wave signal Vw that are output by the differential part 55 have the phase differences of 120 degrees therebetween and, ideally, have waveforms for the rotation angle θ shown in FIG. 29.

Figure 29:
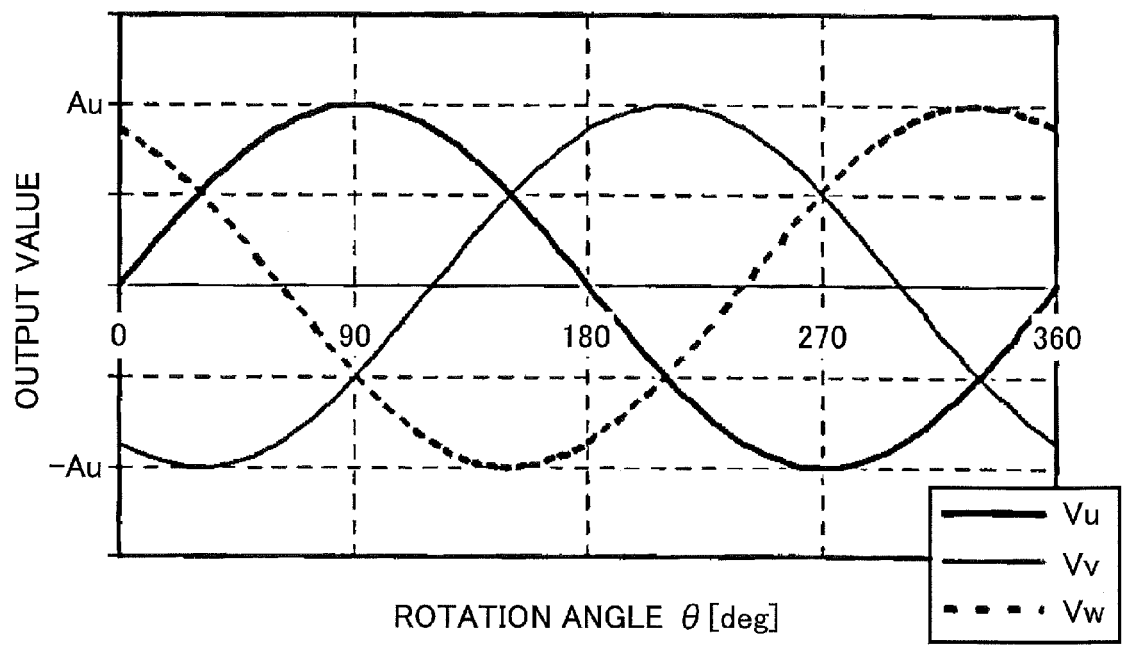
FIG. 29 illustrates one example of sine wave signals at UVW phases in the fifth embodiment.

However, in the waveforms of FIG. 29, for the sake of simplification, it is assumed that the amplitudes Au, Av and Aw of the sine wave signals Vu, Vv and Vw are equal to each other.

Next, the configuration and operations of a vector generation part 45 will be described.

The vector generation part 45 includes an X-axis generation part 46X and generates two mutually orthogonal signals, i.e., an X-axis signal X and a Y-axis signal based on the sine wave signals Vu, Vv and Vw.

The U-phase sine wave signal is output as it is as a Y-axis signal Y as shown in the lower part of the following formula (14).

$$\begin{cases} X = (Vw - Vv)/\sqrt{3} = Au * \cos(\theta) \\ Y = Vu = Au * \sin(\theta) \end{cases} \text{(when } Au = Av = Aw) \quad (14)$$

The X-axis generation part 46X multiplies the subtraction result of the sine wave signals Vw and Vv with an amplification and outputs the calculation result as an X-axis signal X, as shown in the upper part of the formula (14).

Figure 14:
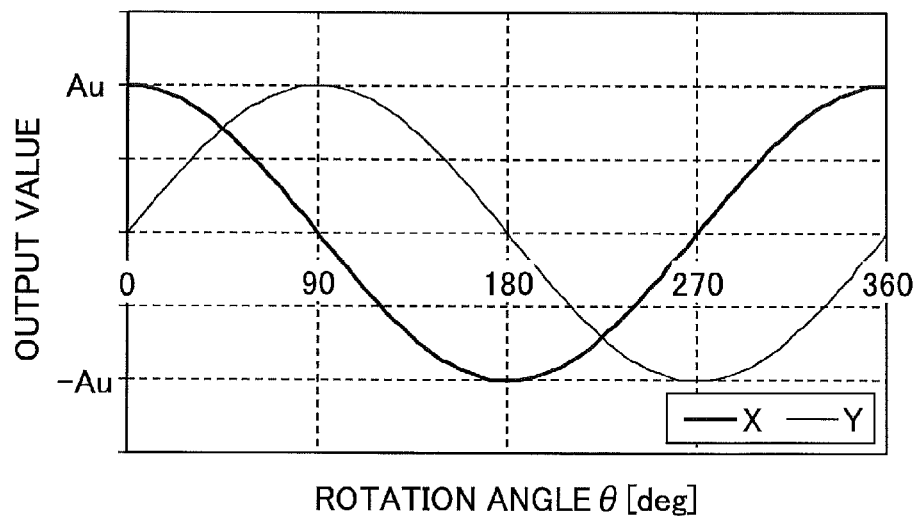
FIG. 14 illustrates one example of an X-axis signal and a Y-axis signal.
Figure 15:
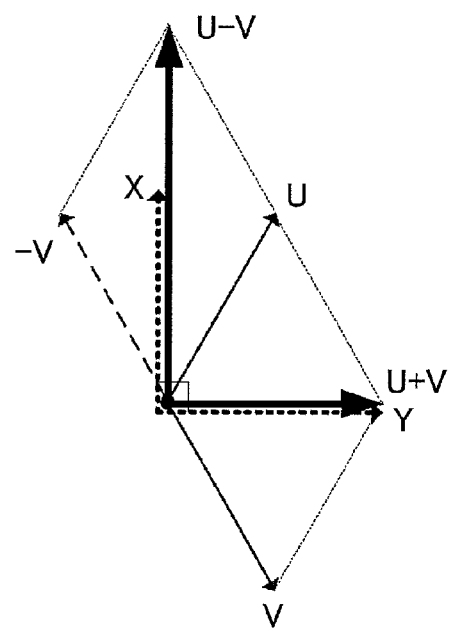
FIG. 15 illustrates a transform from UV axes to XY axes in the first embodiment.
Figure 30:
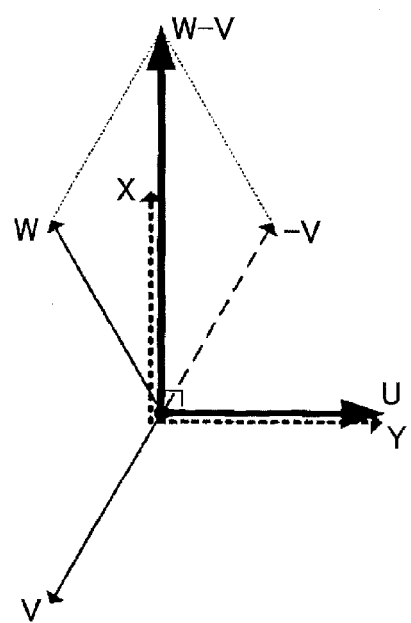
FIG. 30 illustrates a transform from UVW axes to XY axes in the fifth embodiment.

Thus, the configuration of the vector generation part 45 has been described. The operations of the vector generation part 45 correspond to axis transformation carried out on the U-phase, V-phase and W-phase signals, as shown in FIG. 30. The X-axis signal X and the Y-axis signal Y have waveforms mutually orthogonal as shown in FIG. 14 and the formula (14).

According to the fifth embodiment, in the sine wave signals Vu, Vv and Vw having the phase differences of 120 degrees therebetween, the signal orthogonal to Vu is generated from Vv and Vw. However, it is not necessary to limit to such a method and another operations can be applied as long as it is possible to acquire a signal orthogonal to any one of the sine wave signals.

Thus, the vector generation part 45 has been described.

Note that the vector generation part 45 is one example of a vector generation part, and the X-axis signal X and the Y-axis signal Y are an example of a signal expressing a vector.

An oscillator 15 and a frequency divider 16 are the same as those in the first embodiment.

An arc tangent operating part 29 of FIG. 28 carries out a calculation shown in the following formula (15) every time the trigger fs comes, and outputs angle data θd representing the rotation angle of the rotor from the orthogonal X-axis signal X and Y-axis signal Y.

$$\theta d = \arctan\left(\frac{Y}{X}\right) \quad (15)$$

The arc tangent operating part 29 can be easily implemented by using a processor.

Thus, the configuration of the angle detection apparatus of the fifth embodiment has been described. As will be described later, in the same manner as the first embodiment, such a configuration can be provided that, based on the angle data θd, the two-phase pulse signals Ea and Eb are generated.

Thus, the angle detection apparatus in the fifth embodiment has been described. In this angle detection apparatus, the vector is generated based on the mutual calculation result of the respective output signals of the Hall elements that output the plurality of sine wave signals each changing in a sine wave manner according to the rotation angle of the rotor of the motor and having mutually different phases. Then, by using a rotation transform of the thus acquired vector, the rotation angle is detected. As a result, even in a case where the phase differences between the sine waves that are output from a plurality of sensors are not 90 degrees (see FIG. 30), it is possible to detect the angle without employing an optical encoder that is expensive.

Note that in the circuit configuration of the fifth embodiment, it is possible that, the rotation calculation part 30, the sign determination part 20, the angle counter 23 and the pulse generation part 61 of the first embodiment are used instead of the arc tangent operating part 29. In this case, in the same manner as the X-axis signal X and the Y-axis signal Y that are output by the vector generation part 40 being input to the rotation calculation part 30 in the first embodiment, the X-axis signal X and the Y-axis signal Y that are output by the vector generation part 45 are input to the rotation calculation part 30. The configuration and the process carried out on the X-axis signal X and the Y-axis signal Y thereafter are the same as in the first embodiment, and duplicate description will be omitted. By such a modification, it is possible to acquire the two-phase pulse signals Ea and Eb based on the angle data θd in the same manner as the first embodiment. Also, it is possible to acquire the same advantageous effects described above concerning the first embodiment using FIGS. 10 and 21. Since explanation of being able to acquire such advantageous effects is the same as that made above for the first embodiment using FIGS. 10 and 21, duplicate description will be omitted.

Furthermore, in this case, as also described concerning the first embodiment, it is possible to replace the pulse generation part 61 by the pulse generation part 62 shown in FIG. 22. In this case, even when a large error is generated in a detection of the rotation angle due to a noise contamination to a signal expressing a vector or such, it is possible to avoid an abnormal change in the binary signal and the pulse signal. Therefore, it is possible to properly detect a change in the rotation angle based on a change in the binary signal and the pulse signal. Similarly, it is also possible to replace the pulse generation part 61 by the pulse generation part 63 shown in FIG. 24. In this case, even when a large error is generated in a detection of the rotation angle due to a noise contamination to a signal expressing a vector or such, it is possible to avoid an abnormal change in the first pulse signal and the second pulse signal. Therefore, it is possible to properly detect a change in the rotation angle based on a change in the first pulse signal and the second pulse signal.

Sixth Embodiment

Below, the configuration of a motor driving control apparatus according to the sixth embodiment will be described using FIGS. 31 and 32. The duplicate description to the first embodiment or the second embodiment will be omitted.

Figure 31:
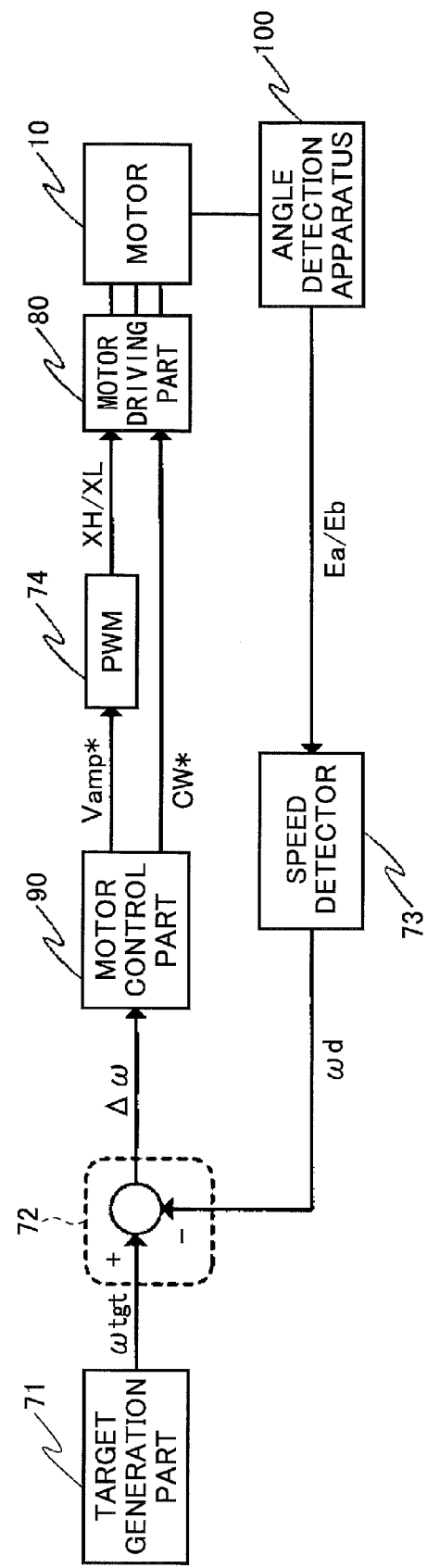
FIG. 31 illustrates an example of a configuration of the entirety of an apparatus according to a sixth embodiment of the present invention.

FIG. 31 is a block diagram illustrating the entire configuration of the motor driving control apparatus. FIG. 32 illustrates a PWM part 74, a motor driving part 80, a motor 10 and an angle detection apparatus 100 included in the motor driving control apparatus.

Figure 32:
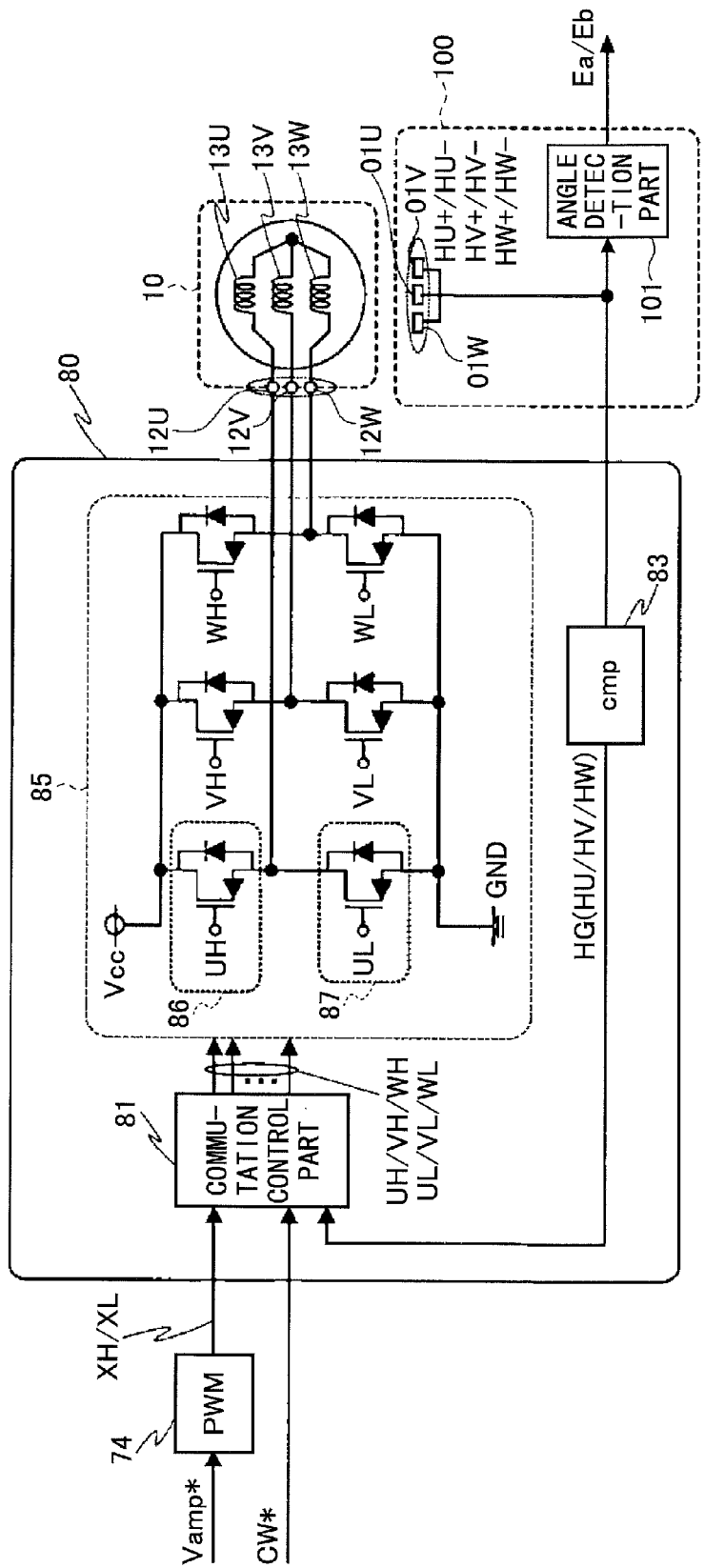
FIG. 32 illustrates configuration examples of a motor, a commutation driving part and an angle detection apparatus in the sixth embodiment.

As shown in FIGS. 12 and 32, the brushless motor 10 includes star-connected three-phase (i.e., U-phase, V-phase and W-phase) coils 13U, 13V and 13W having the phase differences of 120 degrees therebetween (see FIG. 32) and a rotor 11 having permanent magnets where S-poles and N-poles area arranged alternately facing the coils 13U, 13V and 13W (see FIG. 12). The brushless motor 10 is driven and rotated as a result of currents appropriately commuted according to the rotation angle of the rotor 11 being provided to the coils 13U, 13V and 13W from coil terminals 12U, 12V and 12W.

An angle detection apparatus 100 is the angle detection apparatus of the first embodiment and includes the Hall elements 01U, 01V and 01W and an angle detection part 101.

The Hall elements 01U, 01V and 01W are the same as those of the first embodiment. However, the differential signals HU+, HU−, HV+, HV−, HW+ and HW− are output to a motor driving part 80 described later.

The angle detection part 101 includes the configuration of the angle detection apparatus of the first embodiment except the Hall elements 01U, 01V and 01W. The angle detection apparatus 100 outputs two-phase pulse signals Ea and Eb having the phase difference of a quarter cycle and changing according to the rotation angle of the rotor 11. Note that, in this configuration, the angle data θd is not output. However, it is also possible that, in this configuration, the angle data θd is output and is used for position control, sine wave driving and/or the like.

Note that, as the angle detection apparatus 100 in the motor driving control apparatus, another configuration can be applied. That is, as the angle detection apparatus 100, a configuration can be applied where, in the angle detection apparatus of the fifth embodiment shown in FIG. 28, the rotation calculation part 30, the sign determination part 20, the angle counter 23 and the pulse generation part 61 of the first embodiment are provided instead of the arc tangent operating part 29, as mentioned above.

It is also possible that, in the angle detection apparatus of the first embodiment or the angle detection apparatus of the fifth embodiment where the rotation calculation part 30, the sign determination part 20, the angle counter 23 and the pulse generation part 61 of the first embodiment are used instead of the arc tangent operating part 29 as mentioned above, as the angle detection apparatus 100 of the motor driving control apparatus, the pulse generation part 61 can be replaced. That is, in any one of these angle detection apparatuses, the pulse generation part 61 can be replaced by the pulse generation part 62 or the pulse generation part 63 as mentioned above.

That is, the angle detection apparatus 100 in the motor driving control apparatus of the sixth embodiment is not limited to the angle detection apparatus of the first embodiment, and the angle detection apparatus of any other embodiment or that modified appropriately can be used instead. In this case, as the necessity arises, a speed detector 73 described later can be changed appropriately depending on the types of the pulse signals or the like that are output by the angle detection apparatus actually used.

Thus, the angle detection apparatus 100 has been described.

Next, a PWM part 74 carries out pulse-width modulation on a driving voltage instruction value Vamp*, described later, indicating a voltage driving the motor 10, and generates PWM-phase gate signals XH and XL according to predetermined logics.

Below, by using FIG. 35, the operations of the PWM part 74 will be described.

A carrier wave Vc shown at the top of FIG. 35 is a triangular wave having a predetermined PWM period, and has the amplitude from the ground GND to the power supply voltage Vcc. A driving voltage instruction value Vamp* having zero or nonnegative value is compared with the carrier wave Vc, and a PWM signal Xon shown at the second from the top of FIG. 35 is generated.

Next, as shown in the third and fourth from the top of FIG. 35, a PWM-phase gate signal XH delayed by "td" from the PWM signal Xon for the switching devices of upper arms is generated. Also, a PWM-phase gate signal XL inverted from the PWM signal Xon and having the rising up edge delayed by the double "td" from the decaying edge of the PWM signal Xon for the switching devices of lower arms is generated. Note that the above-mentioned "td" is a dead time (short-circuiting preventing period) for preventing short-circuiting of the switching devices of the upper arms and the lower arms.

Thus, the PWM part 74 has been described.

The motor driving part 80 includes a commutation control part 81, a Hall comparator 83 and a driving commutation circuit 85. The motor driving part 80 applies voltages to drive and rotate the rotor 11 to the coil terminals 12U, 12V and 12W based on the PWM-phase gate signals XH/XL indicating magnitudes of voltages to drive the motor, a sign instruction CW* indicating a rotation direction and the output signals of the Hall elements 01U, 01V and 01W indicating the rotation angle of the rotor 11

Below, the motor driving part 80 will be described in detail.

The Hall comparator 83 is a comparator for binarizing the respective differential signals HU+/HU−, HV+/HV− and HW+/HW− of the Hall elements 01U, 01V and 01W according to the logics shown in FIG. 34, and outputs the thus binarized signals as Hall signals HG (HU, HV and HW).

The commutation control part 81 selects appropriate gate signals for the U-phase, the V-phase and the W-phase, respectively, based on the Hi/Lo logics of the Hall signals HG (HU, HV and HW).

Figure 36:
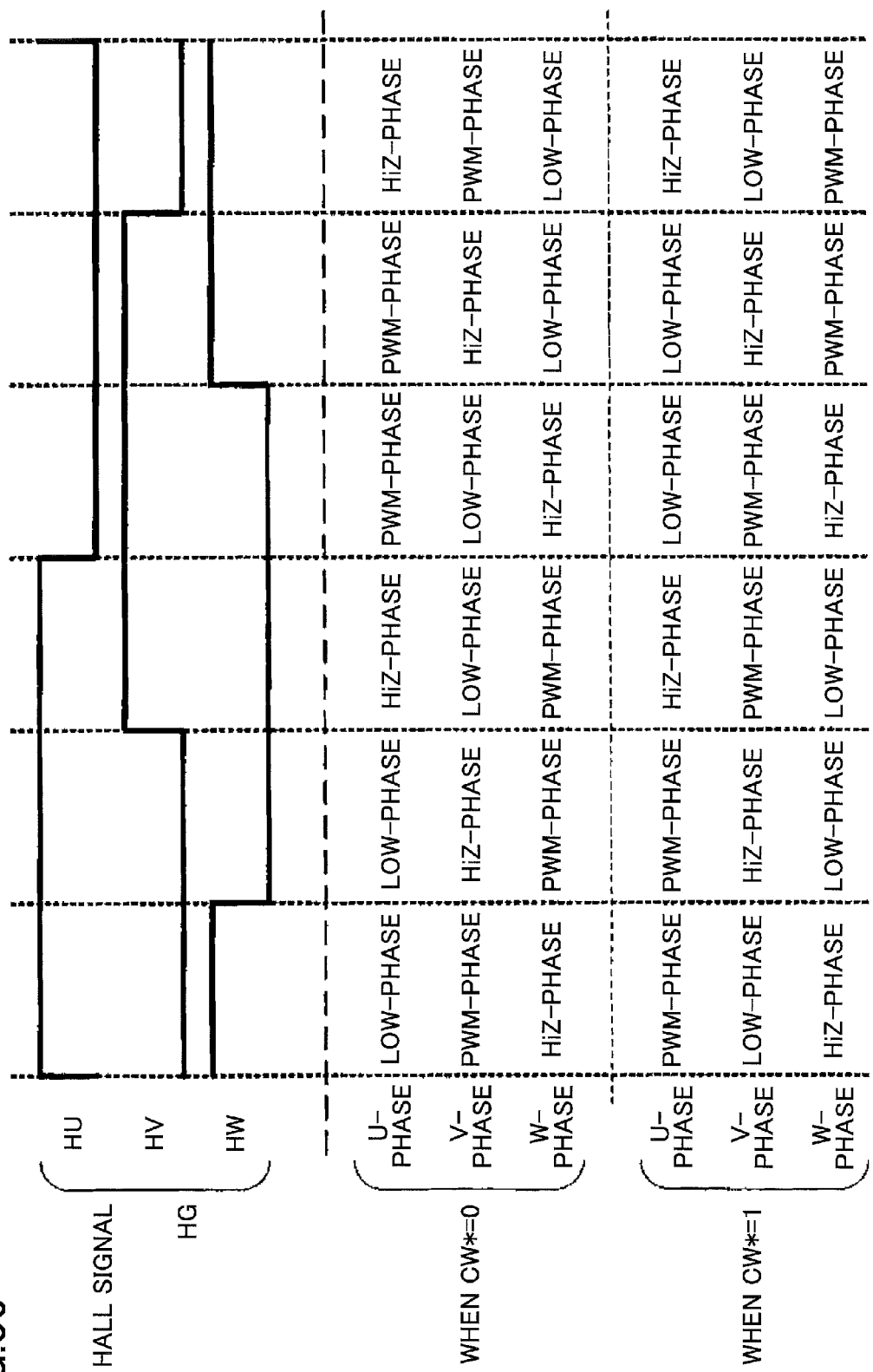
FIG. 36 illustrates one example of Hall signals and rectangular wave driving phase logics.

First, in order to drive and rotate the motor 10 in a rectangular wave driving manner, the U-phase, the V-phase and the W-phase are allocated to any phase states of a PWM-phase, a LOW-phase and a HiZ-phase, according to the state of the Hall signals HG, as shown in FIG. 36. At this time, by exchanging the PWM-phase and the LOW-phase according to the value of the sign instruction CW* that is an instruction value of a direction to drive the motor 10, the driving direction is switched between the normal direction and the reverse direction.

Figures 37, 38:
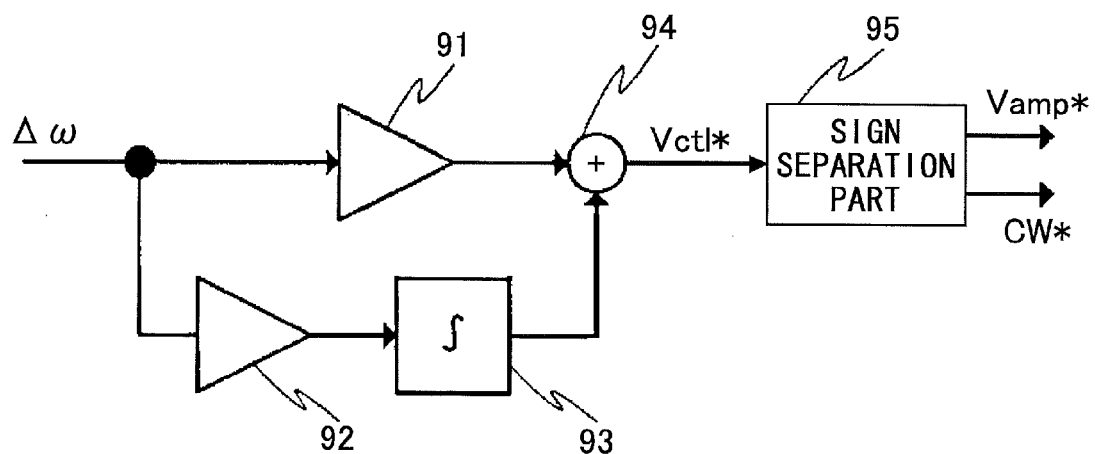
FIG. 37 illustrates one example of phase logics and gate signals.
FIG. 38 illustrates one example of a configuration of a motor control part in the sixth embodiment.

Next, as shown in FIG. 37, for each of the phase states, an upper gate signal and a lower gate signal are selected and are output.

In case of the PWM-phase, the gate signal XH is selected for the upper arms while the gate signal XL is selected for the lower arms. In case of the LOW-phase, the gate signal for the upper arms is set to be Lo constantly while the gate signal for the lower arms is set to be Hi constantly. In case of the HiZ-phase, the gate signal for the upper arms is set to be Lo constantly and also, the gate signal for the lower arms is set to be Lo constantly. These selections are updated for the three phases simultaneously at the beginning of the PWM period.

Thus, the configuration and operations of the commutation control part 81 have been described.

The driving commutation circuit 85 includes, as shown in FIGS. 32 and 33, the upper arms 86, each having the switching device 88 and a diode 89 connected in parallel, connected to the power supply voltage Vcc and the lower arms 87 having the same circuit configurations connected to the ground GND for the three phases. The respective switching devices are driven by the gate signals (UH, VH, WH, UL, VL and WL). Thus, the driving commutation circuit 85 applies the pulse-width modulated voltages to the coils 13U, 13V and 13W of the brushless motor 10, respectively, to supply driving currents thereto and thus drives and rotates the rotor 11.

Thus, the motor driving part 80 has been described.

The motor driving part 80 in the sixth embodiment is one example of a motor driving part.

A target generation part 71 of FIG. 31 generates a target speed ωtgt for a rotation speed to carry out rotation control of the rotor 11.

The speed detector 73 detects the frequency of the two-phase pulse signals Ea and Eb and outputs the detected frequency as a detected speed ωd corresponding to the speed of the rotor 11.

An error calculation part 72 calculates a speed error Δω by acquiring the difference between the target speed ωtgt and the detected speed ωd.

A motor control part 90 outputs driving voltage instruction values Vamp* indicating the amplitudes of voltages to be applied to the coils 13U, 13V and 13W of the rotor 11 to rotate the rotor 11 at the target speed and the sign instruction CW* indicating the rotation direction, based on the speed error Δω.

Below, the configuration of the motor control part 90 will be described in detail using FIG. 38.

A proportional output acquired from multiplying the speed error Δω with a proportion gain 91 is added by an addition part 94 to an integral output acquired from multiplying the speed error Δω with an integration gain 92 and integrating the multiplied result by an integrator 93, and the addition result is output as a control output Vctl*.

A sign separation part 95 outputs the absolute value of the control output Vctl* as a driving voltage instruction value Vamp* and outputs the sign instruction CW* indicating the sign of the control output Vctl*, as shown in the following formula (16).

$$Vamp^* = |Vctl^*| \qquad (16)$$
$$CW^* = \begin{cases} 0 (Vctl^* \geq 0) \\ 1 (Vctl^* < 0) \end{cases}$$

Thus, the motor control part 90 controls the rotation speed or the rotation angle of the rotor 11 of the motor 10.

Thus, the configuration of the motor control part 90 has been described.

The error calculation part 72 and the motor control part 90 in the sixth embodiment are an example of a motor control part.

Figure 39:
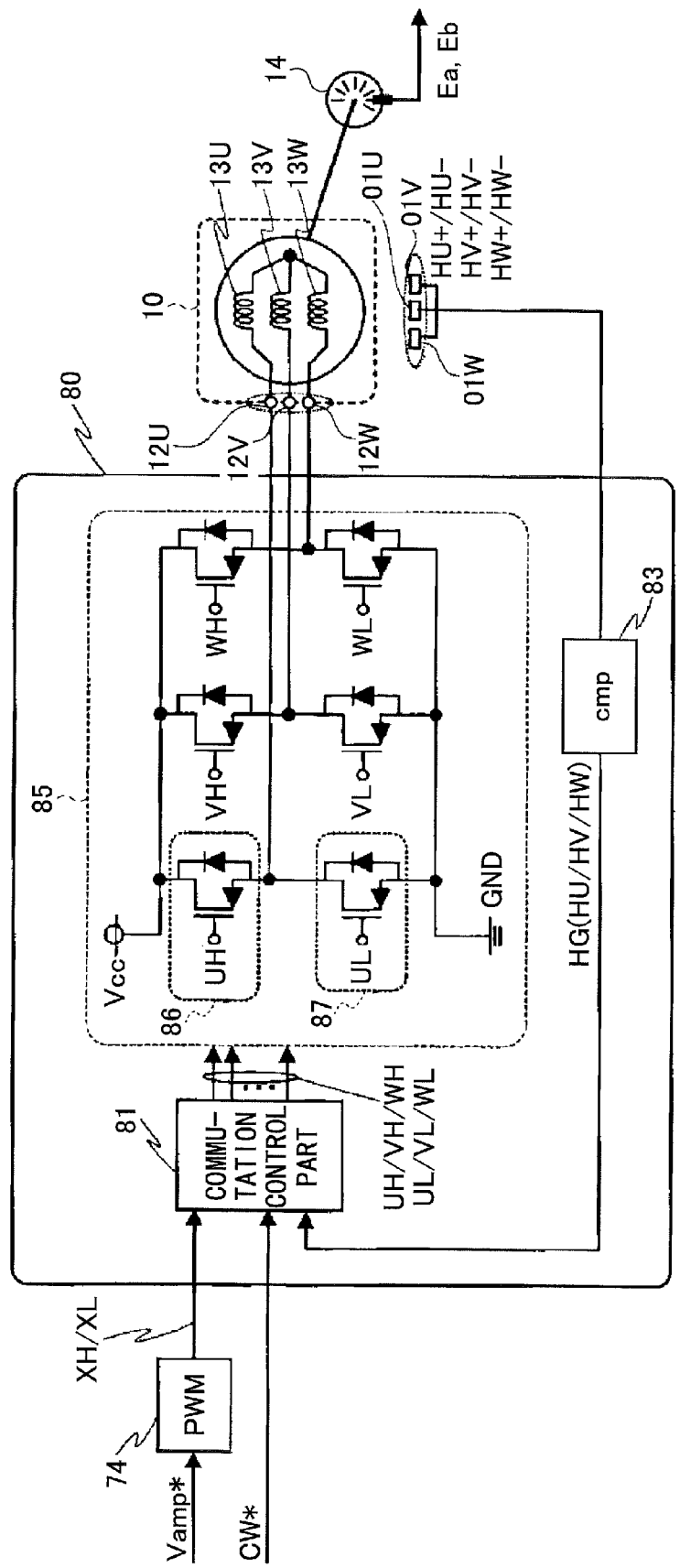
FIG. 39 illustrates one example of a configuration of a motor, a commutation driving part and an encoder in the related art.

Thus, the configuration and operations of the motor driving control apparatus in the sixth embodiment have been described. When FIG. 32 showing the configuration of the sixth embodiment is compared with FIG. 39 showing a configuration of the related art including an encoder, the sixth embodiment is advantageous in the following points.

That is, the output signals of the Hall elements that are provided for the purpose of commutation driving of the brushless motor are used not only for detecting the commutation timing but also for angle detection and rotation control. As a result, it is possible to implement driving control without employing an optical encoder that is expensive or such. Thus, it is possible to provide a motor driving control apparatus at low cost.

That is, position detection is carried out by using the Hall elements originally provided for commutation control of the motor. As a result, it is not necessary to newly add extra sensors, and thus, it is possible to provide the apparatus at low cost. Also, since it is possible to implement rotation control of the motor without additionally preparing an optical encoder that is expensive or such, it is possible to provide the apparatus at low cost.

Note that each of the pulse generation part 61 shown in FIG. 11, the pulse generation part 62 shown in FIG. 22 and the pulse generation part 63 shown in FIG. 24 is a processing part for processing the angle data θd. Therefore, these pulse generation parts 61, 62 and 63 can be mutually replaceable. That is, the pulse generation part 61 can be used also in any other embodiment than the first embodiment. For example, in the fifth embodiment, the respective parts 30, 20, 23 and 61 of the first embodiment can be provided in the angle detection apparatus instead of the arc tangent operating part 29, as mentioned above.

Similarly, the data generation part 62 of the second embodiment can be used also in another embodiment than the second embodiment. For example, the data generation part 62 of the second embodiment can be also used in the first embodiment. That is, in the case of using the data generation part 62 of the second embodiment in the first embodiment of FIG. 11, the data generation part 62 is provided in such a manner that the output signal (the angle data θd) of the angle counter 23 is input to the data generation part 62. The data generation part 62 can also be used in the angle detection apparatus in which, first, as mentioned above, the respective parts 30, 20, 23 and 61 are provided instead of the arc tangent operation part 29 in the fifth embodiment, in the same manner.

Similarly, the pulse generation part 63 can also be provided in the first embodiment. That is, in the case of using the pulse generation part 63 in the first embodiment of FIG. 11, the pulse generation part 63 is provided, in such a manner that the output signal (the angle data θd) of the angle counter 23 is input to the pulse generation part 63. The pulse generation part 63 can also be used in the angle detection apparatus in which, first, as mentioned above, the respective parts 30, 20, 23 and 61 are provided instead of the arc tangent operation part 29 in the fifth embodiment, in the same manner.

According to the embodiments described above, it is possible to provide the angle detection apparatuses in which a rotation angle change signal for acquiring a state of a change of a rotation angle of a rotation shaft generated by the angle detection apparatus is robust against a noise or such.

Thus, the angle detection apparatuses, the motor driving control apparatuses and the angle detection methods have been described in the embodiments. However, the present invention is not limited to the specifically disclosed embodiments, and variations and modifications may be made without departing from the scope of the present invention.

The present application is based on and claims the benefit of priority of Japanese Priority Application No. 2013-266929, filed Dec. 25, 2013, the entire contents of which are hereby incorporated herein by reference.

What is claimed is:

1. An angle detection apparatus comprising:
   a plurality of sensors placed at predetermined positions with respect to a rotation shaft and configured to output a plurality of signals having amplitudes periodically changing according to a rotation of the rotation shaft and having phases different from each other according to the predetermined positions;
   a vector generation part configured to derive a vector having a phase that changes according to the rotation of the rotation shaft based on the plurality of signals that are output by the plurality of sensors;
   an angle search part including a vector rotation part configured to rotate the vector differently from the rotation of the rotation shaft, a comparison part configured to compare the vector rotated by the vector rotation part with a predetermined phase and output a rotation amount determination signal according to a result of the comparison and a rotation amount determination part configured to determine, according to the rotation amount determination signal, a rotation amount by which the vector rotation part rotates the vector, the angle search part being configured to acquire the rotation amount determined by the rotation amount determination part as a rotation angle of the rotation shaft by repeating a process of the rotation amount determination part determining, according to the rotation amount determination signal, the rotation amount by which the vector rotation part rotates the vector and a process of the vector rotation part rotating the vector according to the rotation amount determined by the rotation amount determination part; and
   a rotation angle change signal generation part configured to generate, based on the rotation amount determined by the rotation amount determination part, a rotation angle change signal for acquiring a state of a change of the rotation angle of the rotation shaft, wherein
   the rotation amount determination signal that is output by the comparison part is a signal indicating to increase or decrease a fixed amount for increasing or decreasing, according to the result of the comparison, the rotation amount by which the vector rotation part rotates the vector.

2. The angle detection apparatus as claimed in claim 1, wherein
   the plurality of signals that are output by the plurality of sensors are sine wave signals each changing in a sine wave manner, and
   the vector generation part is configured to generate the vector expressed by a result of mutual calculation of at least two of the sine wave signals.

3. The angle detection apparatus as claimed in claim 1, wherein
   the plurality of signals that are output by the plurality of sensors are sine wave signals each changing in a sine wave manner, and
   the vector generation part is configured to generate the vector expressed by the sine wave signal and a result of mutual calculation of at least two of the sine wave signals.

4. The angle detection apparatus as claimed in claim 1, wherein
   the vector rotation part is configured to rotate the vector generated by the vector generation part by carrying out a product-sum operation of a signal expressing the vector and reference sine waves having a plurality of phases based on the rotation amount determined by the rotation determination part.

5. The angle detection apparatus as claimed in claim 1, wherein
the rotation angle change signal generation part is configured to generate pulse signals having a phase difference of a quarter cycle changing according to the rotation amount determined by the rotation amount determination part.

6. The angle detection apparatus as claimed in claim 1, wherein
the rotation angle change signal generation part is configured to generate
a binary signal indicating the increase or the decrease of the rotation amount determined by the rotation amount determination part, and
a pulse signal indicating the change amount of the rotation amount determined by the rotation amount determination part by the number of pulses or the number of pulse edges.

7. The angle detection apparatus as claimed in claim 1, wherein
the rotation angle change signal generation part is configured to generate two pulse signals that include a first pulse signal and a second pulse signal,
the first pulse signal indicates the increase amount of the rotation amount determined by the rotation amount determination part by the number of pulses or the number of pulse edges, and
the second pulse signal indicates the decrease amount of the rotation amount determined by the rotation amount determination part by the number of pulses or the number of pulse edges.

8. The angle detection apparatus as claimed in claim 1, wherein
the plurality of sensors is a plurality of Hall elements.

9. A motor driving control apparatus comprising:
the angle detection apparatus claimed in claim 1; and
a motor driving part configured to drive a rotor of a motor by applying periodically changed driving voltages to the motor based on the plurality of signals that are output by the plurality of sensors of the angle detection apparatus and have the amplitudes periodically changing according to a rotation of the rotation shaft of the rotor of the motor.

10. The motor driving control apparatus as claimed in claim 9, further comprising:
a motor control part configured to control a rotation speed or a rotation angle of the rotor of the motor based on a signal indicating the rotation amount determined by the rotation amount determination part of the angle detection apparatus or the rotation angle change signal that are output by the rotation angle change signal generation part of the angle detection apparatus.

11. An angle detection method comprising:
deriving a vector having a phase that changes according to a rotation of a rotation shaft based on a plurality of signals that are output by a plurality of sensors, the plurality of sensors being placed at predetermined positions with respect to the rotation shaft and outputting the plurality of signals having amplitudes periodically changing according to the rotation of the rotation shaft and having phases different from each other according to the predetermined positions;
rotating the vector differently from the rotation of the rotation shaft, comparing the vector rotated by the rotating with a predetermined phase and outputting a rotation amount determination signal according to a result of the comparison and determining, according to the rotation amount determination signal, a rotation amount by which the rotating rotates the vector, and acquiring the rotation amount determined by the determining as a rotation angle of the rotation shaft by repeating a process of the determining, according to the rotation amount determination signal, the rotation amount by which the rotating rotates the vector and a process of the rotating the vector according to the rotation amount determined by the determining; and
generating, based on the rotation amount determined by the determining, a rotation angle change signal for acquiring a state of a change of the rotation angle of the rotation shaft, wherein
the rotation amount determination signal that is output as a result of the comparing is a signal indicating to increase or decrease a fixed amount to increase or decrease, according to the result of the comparing, the rotation amount by which the rotating rotates the vector.

* * * * *